US010225468B2

United States Patent
Picalausa

(10) Patent No.: US 10,225,468 B2
(45) Date of Patent: Mar. 5, 2019

(54) IMAGING SYSTEMS AND METHODS WITH IMAGE DATA PATH DELAY MEASUREMENT

(71) Applicant: OmniVision Technologies, Inc., Santa Clara, CA (US)

(72) Inventor: Jenny Picalausa, Hakadal (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 297 days.

(21) Appl. No.: 14/994,731

(22) Filed: Jan. 13, 2016

(65) Prior Publication Data

US 2017/0201681 A1    Jul. 13, 2017

(51) Int. Cl.
| | |
|---|---|
| *H04N 5/05* | (2006.01) |
| *H04N 5/232* | (2006.01) |
| *H04N 5/247* | (2006.01) |
| *H04N 5/262* | (2006.01) |
| *H04N 5/265* | (2006.01) |
| *H04N 5/04* | (2006.01) |
| *H04N 1/00* | (2006.01) |

(52) U.S. Cl.
CPC .......... *H04N 5/23238* (2013.01); *H04N 1/00* (2013.01); *H04N 5/04* (2013.01); *H04N 5/05* (2013.01); *H04N 5/232* (2013.01); *H04N 5/23229* (2013.01); *H04N 5/247* (2013.01); *H04N 5/265* (2013.01); *H04N 5/2628* (2013.01)

(58) Field of Classification Search
CPC ................................................. H04N 5/23238
See application file for complete search history.

(56) References Cited

U.S. PATENT DOCUMENTS

| | | | | | |
|---|---|---|---|---|---|
| 6,222,580 | B1 * | 4/2001 | Yamada | ............... | G02B 26/127 |
| | | | | | 347/132 |
| 6,552,741 | B2 * | 4/2003 | Nakahara | ................ | B41J 2/471 |
| | | | | | 347/239 |
| 8,340,453 | B1 * | 12/2012 | Chen | ...................... | G06T 5/002 |
| | | | | | 382/254 |

(Continued)

FOREIGN PATENT DOCUMENTS

JP    2008141692 A    6/2008

OTHER PUBLICATIONS

Taiwanese Patent Application No. 105141220, English translation of Office Action dated Apr. 20, 2018, 5 pages.

*Primary Examiner* — Jayanti K Patel
*Assistant Examiner* — Irfan Habib
(74) *Attorney, Agent, or Firm* — Lathrop Gage LLP

(57) ABSTRACT

An imaging system with image data path delay measurement includes (a) a first image sensor chip that includes a pixel array for generating a first image in response to light incident upon the pixel array, and a time mark generator for, upon receiving a time mark command, encoding a signature in the first image to generate a first marked image with the signature and image data from the first image, and (b) an image signal processing chip for processing the first marked image, wherein the image signal processing chip includes a data path delay measurement module for generating the time mark command and estimating image data path delay from the pixel array to the data path delay measurement module based upon time delay between (i) generating the time mark command and (ii) receipt of the signature as part of the first marked image.

17 Claims, 16 Drawing Sheets

(56) References Cited

U.S. PATENT DOCUMENTS

| | | | |
|---|---|---|---|
| 8,547,606 B2* | 10/2013 | Matsuo | H04N 1/047 |
| | | | 358/474 |
| 9,094,615 B2* | 7/2015 | Aman | G01S 3/7864 |
| 9,983,485 B2* | 5/2018 | Bogaart | G03F 7/70633 |
| 2002/0158965 A1* | 10/2002 | Ema | H04N 1/053 |
| | | | 347/250 |
| 2005/0024476 A1 | 2/2005 | Seto et al. | |
| 2008/0062163 A1* | 3/2008 | Uchida | G09G 3/3648 |
| | | | 345/214 |
| 2012/0105592 A1 | 5/2012 | Chen | |
| 2013/0124471 A1* | 5/2013 | Chen | H04N 5/23238 |
| | | | 707/624 |
| 2016/0127875 A1* | 5/2016 | Zampini, II | H04W 4/043 |
| | | | 370/311 |
| 2017/0180800 A1* | 6/2017 | Mayrand | H04N 21/44218 |
| 2017/0201681 A1* | 7/2017 | Picalausa | H04N 1/00 |
| 2018/0018778 A1* | 1/2018 | Haverkamp | G01B 5/008 |

\* cited by examiner

IMAGING SYSTEMS AND METHODS WITH IMAGE DATA PATH DELAY MEASUREMENT

BACKGROUND

Imaging is employed in an ever increasing range of applications. Some of these applications are time sensitive. For example, machine vision may require knowledge of exactly when a certain event occurred. Signal processing occurring after exposure of an image sensor to generate of an output image, or other image-based output data, is associated with some amount of processing time, which may be in the range of, for example, microseconds, milliseconds, or a fraction of a second. The processing time depends on the type of processing to be performed and the type of circuitry employed to perform the processing. For a given imaging system, the processing time may vary depending on the mode of operation. For example, a change in exposure time or resolution may affect the processing time.

Some imaging systems utilize two or more cameras to capture two or more respective image streams, which are stitched together to form a single composite image stream. Such imaging systems may be implemented in surveillance or automotive applications to provide an observer, e.g., a driver, with a single image stream of a larger field of view than what can be achieved with a single camera. Generation of the composite image stream requires communicating the individual image streams to a common processing system that stitches together the individual image streams. The composite image stream is subject to data path delays between the individual image sensors and the common processing system, and artifacts may occur wherein different spatial portions of the composite image stream are out of sync with each other.

SUMMARY

In an embodiment, an imaging system with image data path delay measurement includes a first image sensor chip. The first image sensor chip includes a pixel array for generating a first image in response to light incident upon the pixel array, and a time mark generator for, upon receiving a time mark command, encoding a signature in the first image to generate a first marked image with the signature and image data from the first image. The imaging system further includes an image signal processing chip for processing the first marked image. The image signal processing chip includes a data path delay measurement module for generating the time mark command and estimating image data path delay from the pixel array to the data path delay measurement module based upon time delay between (a) said generating the time mark command and (b) receipt of the signature as part of the first marked image.

In an embodiment, a method for measuring image data path delay of an imaging system includes at a first time, communicating a first time mark command from an image signal processing chip to a first image sensor chip, and upon receipt of the first time mark command at the first image sensor chip, encoding a first signature in a first image captured by a first pixel array on the first image sensor chip, to generate a first marked image with the first signature and image data from the first image. The method further includes communicating the first marked image from the image sensor chip to the image signal processing chip, identifying the first signature in the first marked image, using a data path delay measurement module onboard the image signal processing chip, and estimating a first image data path delay from capture of the first image by the first pixel array to the data path delay measurement module based upon time span from the first time to time of said identifying.

In an embodiment, an image sensor chip configured for image data path delay measurement includes (a) a pixel array for generating a first image in response to light incident upon the pixel array, (b) an input interface for receiving a time mark command from circuitry external to the image sensor chip, (c) a time mark generator for, upon receiving the time mark command, encoding a signature in the first image to generate a marked image with the signature and image data from the first image, and (d) an output interface for outputting the marked image to an image processing system external to the image sensor chip.

DETAILED DESCRIPTION OF THE EMBODIMENTS

Figure 1:
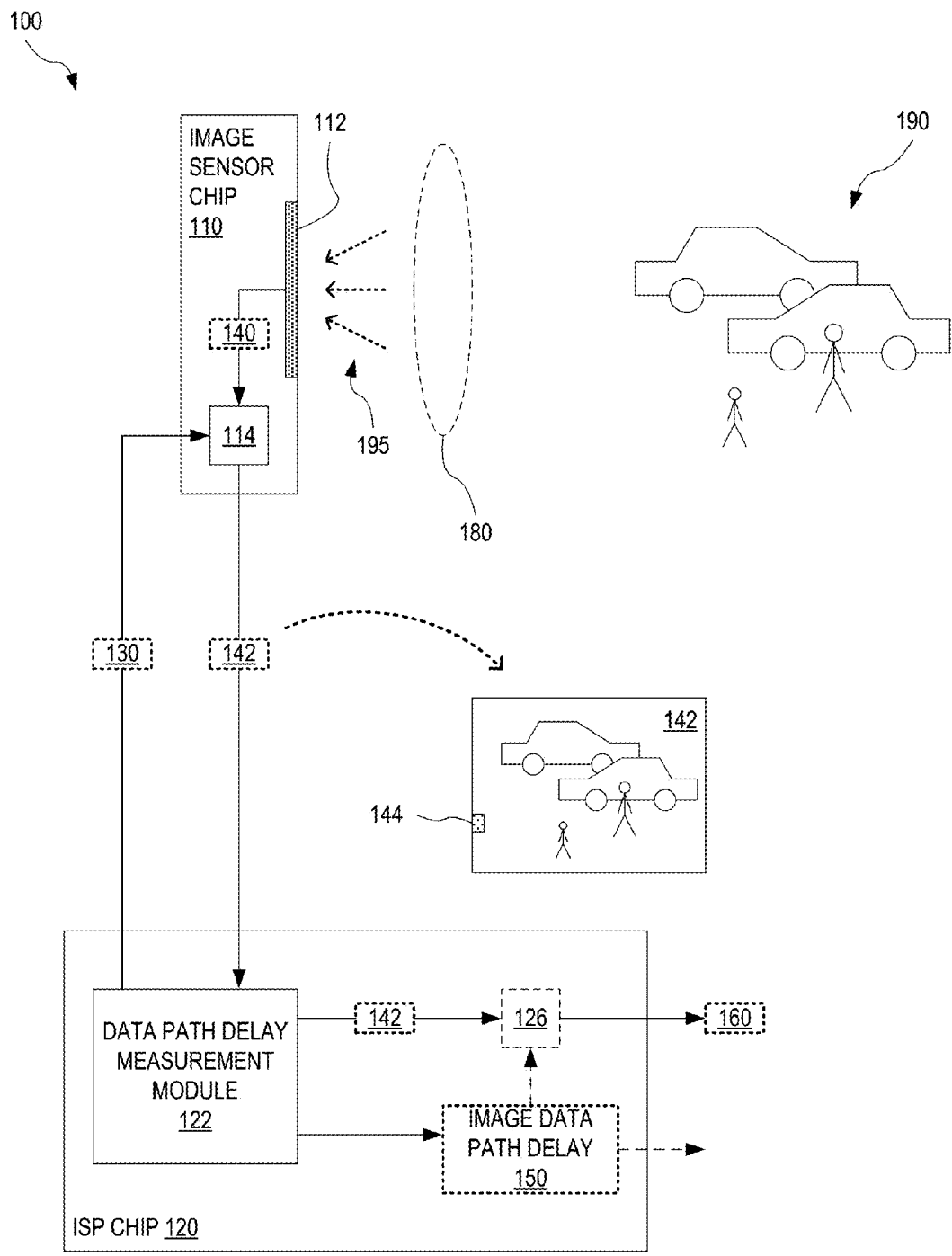
FIG. 1 illustrates an imaging system with integrated image data path delay measurement functionality, according to an embodiment.

FIG. 1 illustrates one exemplary imaging system 100 with integrated image data path delay measurement functionality. Imaging system 100 includes an image sensor chip 110 and an image signal processing (ISP) chip 120. Image sensor chip 110 captures an image 140, and ISP chip 120 processes image data associated with image 140 to produce output data 160. Each of image sensor chip 110 and ISP chip 120 is an integrated circuit. Image sensor chip 110 and ISP chip 120 include circuitry configured to estimate an image data path delay 150 between capture of image 140 and arrival at a point on the image data path within ISP chip 120. Imaging system 100 is thus configured to estimate image data path delay 150, for example to properly account for changes in image data path delay 150 or to utilize image data path delay 150 in the processing performed by ISP chip 120 to generate output data 160. Imaging system 100 performs this image data path delay measurement as an integral part of the processing of image 140 to produce output data 160. Depending on the mode of image capture by pixel array 112 and the forms of image processing taking place onboard image sensor chip 110 and also onboard ISP chip 120, an exemplary image data path delay 150 is in the range from about 50 microseconds to about 100 milliseconds.

Image sensor chip 110 includes a pixel array 112. Pixel array 112 includes (a) an array of photosensitive pixels that generate electrical signals in response to light 195 incident thereon and (b) readout circuitry for reading out the electrical signals from the array of photosensitive pixels to produce image 140. In the exemplary scenario shown in FIG. 1, pixel array 112 cooperates with an imaging objective 180 to generate image 140 of a scene 190. In certain embodiments, image sensor chip 110 is coupled with imaging objective 180 in a camera module. However, image sensor chip 110 may be utilized in lens free imaging without departing from the scope hereof. Image sensor chip 110 also includes a time mark generator 114 that, upon receiving a time mark command 130, encodes a signature 144 in image 140 to generate a marked image 142 with (a) image data from image 140 and (b) signature 144 if time mark generator 114 receives a time mark command 130.

ISP chip 120 includes a data path delay measurement module 122 that generates time mark command 130 and estimates an image data path delay 150 from pixel array 112 to data path delay measurement module 122 based upon the time delay between (a) time of generating time mark command 130 and (b) time of receipt by data path delay measurement module 122 of signature 144 as part of the marked image 142.

In one example of use, data path delay measurement module 122 communicates a time command 130 to image sensor chip 110 for every image 140 generated by image sensor chip 110 or for a subset of images 140 generated by image sensor chip 110. Thus, not all marked images 142 need include signature 144. In another example of use, data path delay measurement module 122 communicates two or more time mark commands 130 to time mark generator 114 for encoding of two or more respective signatures 144 in a single marked image 142. Data path delay measurement module 122 may vary the rate of generation of time mark command 130 during operation.

ISP chip 120 may include processing circuitry 126 that receives marked image 142 from data path delay measurement module 122 and processes marked image 142 to produce output data 160. Output data 160 may be image data or non-image data determined from marked image 142. In one embodiment, processing circuitry 126 utilizes image data path delay 150 to generate output data 160. In one example of this embodiment, processing circuitry 126 utilizes image data path delay 150 to estimate the time of capture of image 140, and includes in output data 160 a time stamp indicating the time of capture of image 140. In another example of this embodiment, processing circuitry 126 processes a series of marked images 142, wherein at least some of marked images 142 include signature 144. In this example, processing circuitry 126 generates a stream of output images 160 with the timing of output images 160 being corrected based upon image data path delay 150, so as to properly reflect the actual timing of events in scene 190 despite possible variation in image data path delay 150 during capture of the stream of images 140.

In an embodiment, ISP chip 120 is configured to output image data path delay 150. In a related exemplary use scenario, image data path delay 150 is monitored over time and a significant change in image data path delay 150 may indicate a problem in imaging system 100.

Without departing from the scope hereof, image sensor chip 110 may be supplied as a standalone device that is configured to cooperate with a third-party ISP chip 120 as discussed above. Also without departing from the scope hereof, ISP chip 120 may be supplied as a standalone device configured to cooperate with an image sensor chip 110 as discussed here, or configured to cooperate with a plurality of image sensor chips 110 as discussed below in reference to FIG. 16.

Figure 2:
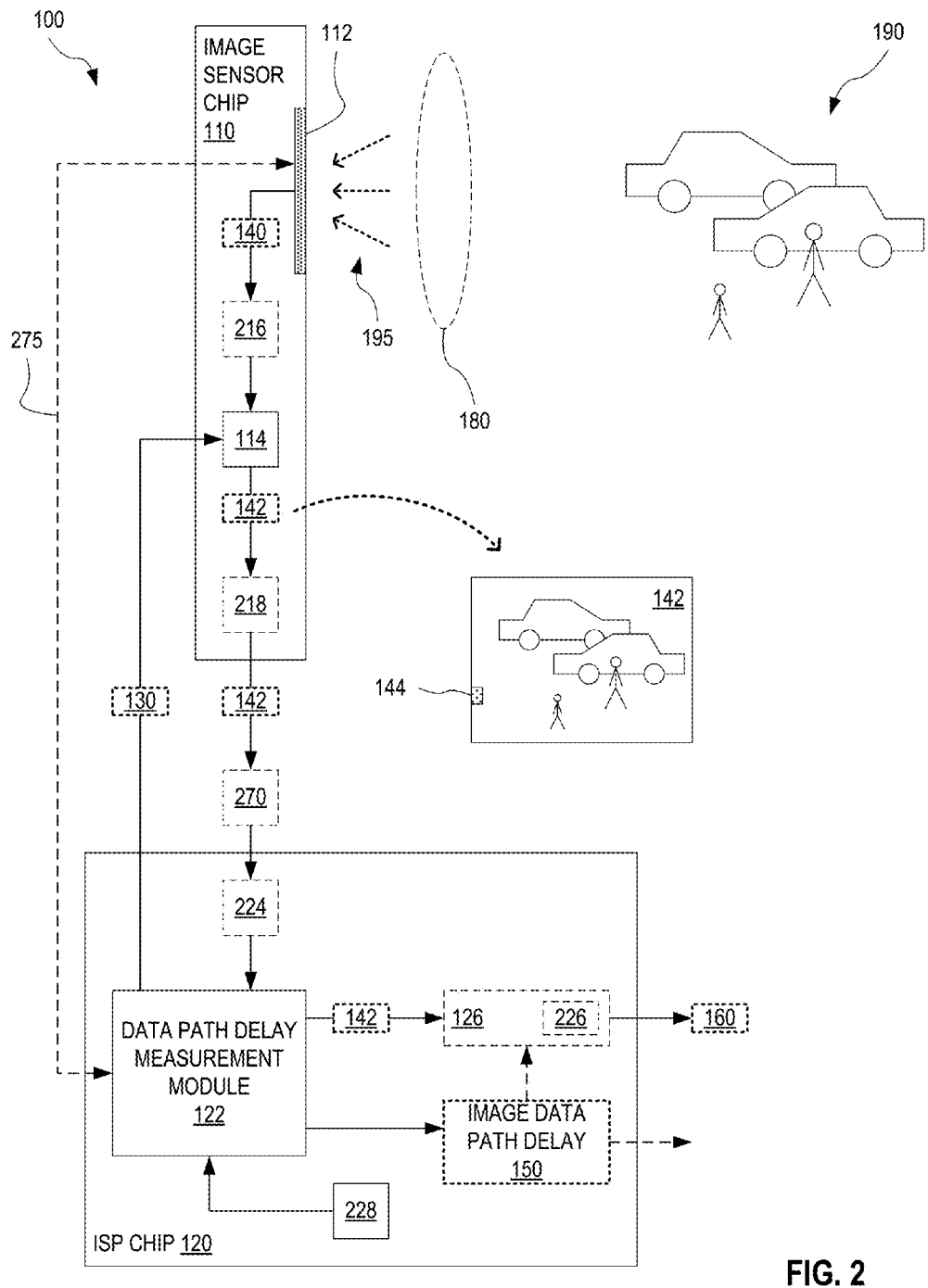
FIG. 2 illustrates the imaging system of FIG. 1 in further detail, according to an embodiment.

FIG. 2 illustrates imaging system 100 in further detail. ISP chip 120 includes a clock 228 for providing time to data path delay measurement module 122. Data path delay measurement module 122 utilizes the time provided by clock 128 to determine (a) the time of generation of time mark command 130 and (b) the time of receipt by data path delay measurement module 122 of signature 144 as part of the marked image 142.

In certain embodiments, image sensor chip 110 includes first processing circuitry 216 that processes image 140 prior to communicating image 140 to time generator 114. First processing circuitry 216 may be configured to perform one or more of analog-to-digital conversion of the captured image, white balancing of the captured image if the captured image is a color image, gain adjustment, and other analog and/or digital signal processing known in the art. In one embodiment, first processing circuitry 216 performs the minimal amount of processing required for time mark generator 114 to process image 140, such that the image data path delay introduced by first processing circuitry 216, and not accounted for in image data path delay 150, is minimized. In an embodiment, image sensor chip 110 includes second processing circuitry 218 that processes marked image 142 before image sensor chip 110 communicates marked image 142 to ISP chip 120. Second processing circuitry 228 may be configured to perform one or more of analog-to-digital conversion of marked image 142 if marked image 142 is in analog form, white balancing of marked image 142 if marked image 142 is a color image, gain adjustment, spatial binning of marked image 142 to adjust its resolution, and other analog and/or digital signal processing known in the art.

ISP chip 120 may include processing circuitry 224 that processes marked image 142 before communicating marked image 142 to data path delay measurement module 122.

In an embodiment, ISP chip 120 includes an image cleanup module 226 that removes signature 144 from marked image 142. ISP chip 120 may implement image cleanup module 226 as part of processing circuitry 126 (as shown in FIG. 2), as part of data path delay measurement module 122, or elsewhere in the image data path within ISP chip 120 and downstream from data path delay measurement module 122.

Time mark generator 114 includes electronic circuitry capable of defining a pixel intensity in marked image 142. In one example, this electronic circuitry is transistor-based circuitry as known in the art. In another example, time mark generator 114 is implemented by a microprocessor of a field programmable gate array onboard image sensor chip 110. This microprocessor, or field programmable gate array, may be shared with other functionality onboard image sensor chip 110, such as first processing circuitry 216 and/or second processing circuitry 218. Data path delay measurement module 122 may be implemented by a microprocessor or a field programmable gate array onboard ISP chip 120. This microprocessor, or field programmable gate array, may be shared with other functionality onboard ISP chip 120, such as processing circuitry 224 and/or processing circuitry 126.

In an embodiment, imaging system 100 further includes intermediate processing circuitry 270 through which marked image 142 must pass between image sensor chip 110 and ISP chip 120. Intermediate processing circuitry 270 may include a buffer that performs full frame buffering of marked image 142, or row-wise buffering of marked image 142. Full frame buffering generally introduces a significant image data path delay, as compared to pixel-by-pixel buffering or row-by-row buffering, since the full frame must be loaded into the buffer before the next processing step may commence. For example, if image sensor chip 110 captures images 140 at a rate of 60 frames per second, the image data path delay introduced by full frame buffering may be as much as 33 milliseconds. Implementations of imaging system 100 that include full frame buffering between image sensor chip 110 and ISP chip 120 may therefore be associated with a significant image data path delay 150. Furthermore, this significant image data path delay 150 may be subject to variation, for example caused by changes in size or resolution of marked image 142, or by variation in other processing performed by intermediate processing circuitry 270. For these reasons, it is also advantageous to implement image sensor chip 110 without full frame buffering prior until after processing by time mark generator 114. In one embodiment, image sensor chip 110 does not perform full frame buffering. In this embodiment, all image buffering onboard image sensor chip 110 may be row-by-row buffering or pixel-by-pixel buffering. In another embodiment, image sensor chip 110 includes second processing circuitry 218 implemented with a full frame buffer that buffers the full frame of marked image 142.

In an embodiment, data path delay measurement module 122 is communicatively coupled with pixel array 112 via a connection 275, such that the timing of generation of time command 130 by data path delay measurement module 122 may be coordinated with the timing of capture of image 140 by pixel array 112. Connection 275 may utilize the same inter-chip communication link as that used for time command 130. Connection 275 need not be a direct connection between data path delay measurement module 122 and pixel array 112. Connection 275 may pass through other components of ISP chip 120 and/or image sensor chip 110. In one implementation of this embodiment, pixel array 112 is the master and data path delay measurement module 122 is the slave. In this implementation, data path delay measurement module 122 generates time mark command(s) 130 in accordance with image capture timing signal(s) received from pixel array 112. In another implementation of this embodiment, data path delay measurement module 122 is the master and pixel array 112 is the slave. In this implementation, pixel array 112 captures image(s) 140 in accordance with trigger signal(s) received from data path delay measurement module 122.

Figure 3:
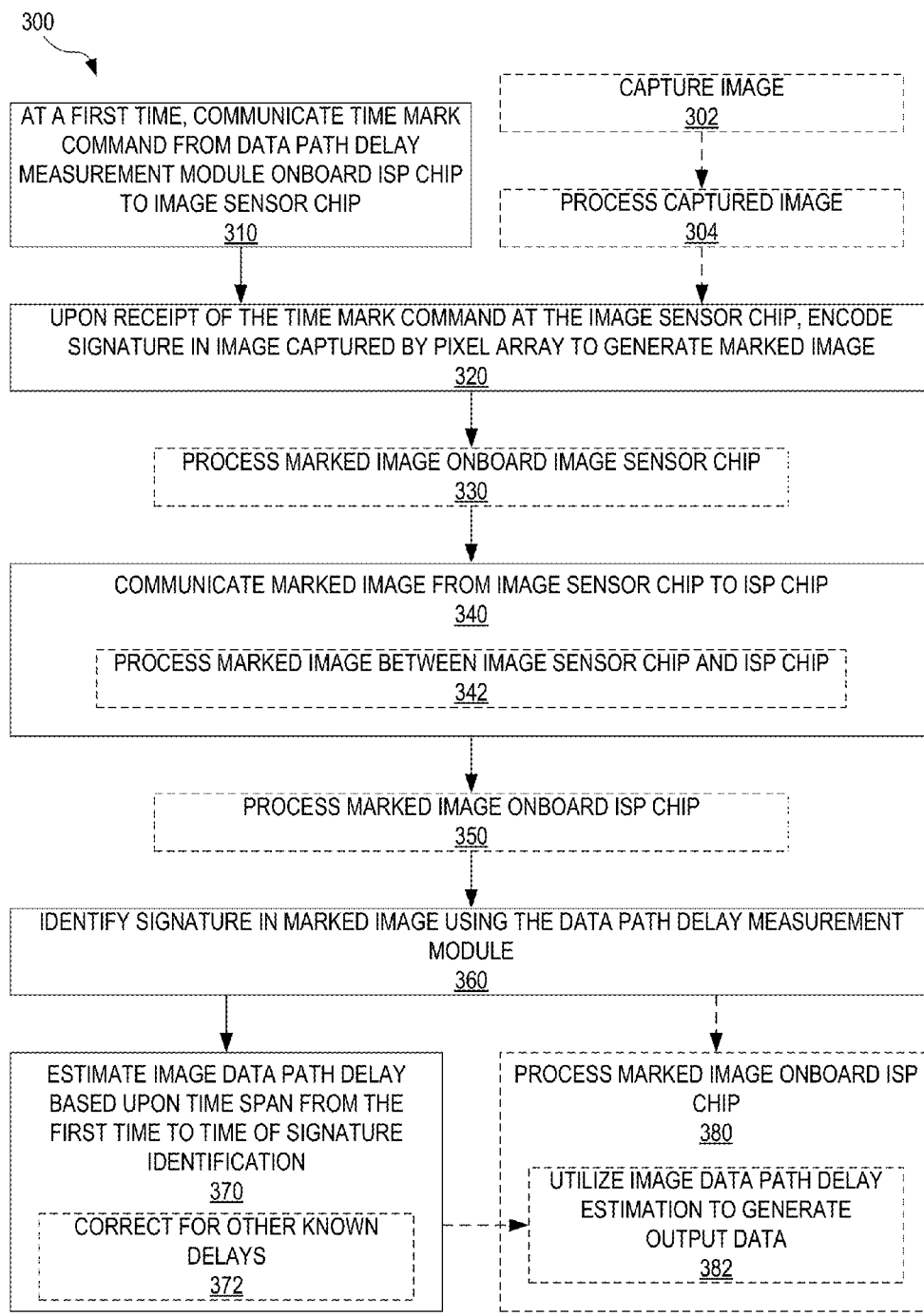
FIG. 3 illustrates a method for measuring the image data path delay of an imaging system including an image sensor chip and an image signal processing chip communicatively coupled with the image sensor chip, according to an embodiment.

FIG. 3 illustrates one exemplary method 300 for measuring the image data path delay of an imaging system including an image sensor chip and an ISP chip communicatively coupled with the image sensor chip. Method 300 integrates the image data path delay measurement with processing of a captured image. Method 300 may be performed by imaging system 100.

In a step 310, a data path measurement module onboard the ISP chip communicates a time mark command to the image sensor chip. Step 310 occurs at a first time $T_1$. In one example of step 310, data path delay measurement module 122 generates time mark command 130 and communicates time mark command 130 to time mark generator 114. Data path delay measurement module 122 records as $T_1$ the time of performing step 310, wherein this time is provided by clock 228.

In a step 320, upon receipt of the time mark command of step 310, the image sensor chip encodes a signature in an image captured by a pixel array onboard the image sensor chip. Without departing from the scope hereof, for example if the image sensor chip is not processing a captured image when receiving the time mark command, the image sensor chip may encode the signature in the first captured image processed by the image sensor chip after receipt of the time mark command. Step 320 produces a marked image that includes captured image data as well as the signature. In one example of step 320, time mark generator 114 encodes signature 144 in image 140 processed by time mark generator 114 upon receipt of time mark command 130 to generate marked image 142. If time mark generator 114 is not processing an image 140 when receiving time mark command 130, time mark generator 114 encodes signature 144 in the first image 140 processed by time mark generator 114 after receiving time mark command 130. This situation may arise when time mark generator 114 receives time mark command 130 after completing processing of one image 140 and while waiting for the next image 140.

In certain embodiments, method 300 includes a step 302 of capturing the image processed in step 320. Herein, "capturing" includes the processes of reading out image signals from pixels of a pixel array, for example using correlated double sampling. In one example of step 302, pixel array 112 captures image 140. Method 300 may further include a step 304 of processing the image captured in step 302 prior to performing step 320. Such processing may include one or more of analog-to-digital conversion of the captured image, white balancing of the captured image if the captured image is a color image, gain adjustment, and other analog and/or digital signal processing known in the art. In one example of step 304, first processing circuitry 216 processes image 140, for example to perform one or more of analog-to-digital conversion of image 140, white balancing of image 140 if image 140 is a color image, gain adjustment, and other analog and/or digital signal processing known in the art.

In an optional step 330, the image sensor chip further processes the marked image generated in step 320. Step 330 may include analog-to-digital conversion of the marked image, if the marked image is in analog form. Furthermore, step 330 may include white balancing of the marked image if the marked image is a color image, gain adjustment, spatial binning of the marked image to adjust its resolution, and other analog and/or digital signal processing known in the art. In one embodiment, step 330 includes processing that requires full frame buffering of marked image 140. Since full frame buffering generally introduces a significant image data path delay, any such processing is advantageously performed in step 330, as opposed to in step 320. In one example of step 330, second processing circuitry 218 processes marked image 142, for example to perform one or more of analog-to-digital conversion of marked image 142 if marked image 142 is in analog form, white balancing of marked image 142 if marked image 142 is a color image, gain adjustment, spatial binning of marked image 142 to adjust its resolution, and other analog and/or digital signal processing known in the art.

In a step 340, the image sensor chip communicates the marked image to the ISP chip. In one example of step 340, image sensor chip 110 communicates marked image 142 to ISP chip 120. Step 340 may include a step 342 of processing the marked image between the image sensor chip and the ISP chip. In one example of step 342, intermediate processing circuitry 270 processes marked image 142.

In an optional step 350, the marked image is processed onboard the ISP chip. Step 350 may perform one or more of improving the image quality of the marked image, white balancing, contrast adjustment, tone mapping, and other image processing known in the art. In one example of step 350, processing circuitry 224 processes marked image 142. Processing circuitry 224 may perform one or more of improving the image quality of marked image 142, white balancing, contrast adjustment, tone mapping, and other image processing known in the art.

In a step 360, the data path delay measurement module onboard the ISP chip identifies the signature encoded in the marked image. In one example of step 360, data path delay measurement module 122 identifies signature 144 in marked image 142. Data path delay measurement module 122 records as a time $T_2$ the time when the signature 144 is identified, wherein this time is provided by clock 228.

A step 370 estimates the image data path delay, from image capture by a pixel array of the image sensor chip to the data path delay measurement module based upon the time span from $T_1$ to the time $T_2$ of identifying the signature in step 360. In one example of step 370, data path delay measurement module 122 calculates image data path delay 150 as $T_2-T_1$.

In one embodiment, step 370 outputs the estimated image data path delay as $T_2-T_1$. In another embodiment, step 370 includes a step 372 of correcting the estimated image data path delay for known delays not included in the time difference $T_2-T_1$. Step 372 may add to $T_2-T_1$ a pre-calibrated image data path delay representing the image data path delay from the time of image capture to the time of encoding the signature in step 320, and/or step 372 may deduct a pre-calibrated transfer time representing the time span from $T_1$ to the time of encoding the signature in step 320. A typical transfer time may be in the range of nanoseconds. Step 372 may be performed by data path delay measurement module 122.

Method 300 may include a step 380 of processing the marked image onboard the IPS chip after performing step 360. In one example of step 380, processing circuitry 126 processes marked image 142 to produce output data 160. Exemplary processing in step 380 includes, but is not limited to, recognition of objects in marked image 142 and removal of time signature 144 from marked image 142. Removal of time signature 144 from marked image 142 may be performed by image cleanup module 226.

Optionally, step 380 includes a step 382 of utilizing the image data path delay estimation, obtained in step 370, to generate output data. Step 380 may include time stamping of an output image or associated output data, wherein the time stamping accounts for the estimated image data path delay to indicate a time of capture of the associated image 140. In implementations where method 300 processes an image stream, step 382 may include utilizing one or more estimated image data path delays to generate a stream of output images 160 with the timing of output images 160 being corrected based upon the estimated image data path delay(s), so as to properly reflect the actual timing of events in scene 190 despite possible variation in the image data path delay during capture of the image stream.

In one embodiment, step 320 receives the captured image in digital form. In an example of this embodiment, method 300 includes steps 302 and 304, wherein the only processing performed by step 304 is analog-to-digital conversion of the captured image. In this example, step 320 is performed at the earliest possible time after image capture in step 302, which results in the shortest possible delay between image capture and encoding of the signature. This example minimizes the time span between image capture and $T_1$ for implementations of method 300 that, in step 320, encode the signature in a digital image, and therefore reduces image data path delay not accounted for by such implementations of method 300. In another embodiment, step 320 receives the captured image in analog form. By encoding the signature in an analog image, this embodiment may further reduce (or even eliminate) the time span between image capture and $T_1$, as compared to embodiments that encode the signature in a digital image, so as to further reduce (or even eliminate) image data path delay not accounted for by method 200.

In one embodiment, method 300 is free of full frame buffering at least until after step 320, so as to avoid significant image data path delay in addition to the image data path delay accounted for by method 300.

Figure 4:
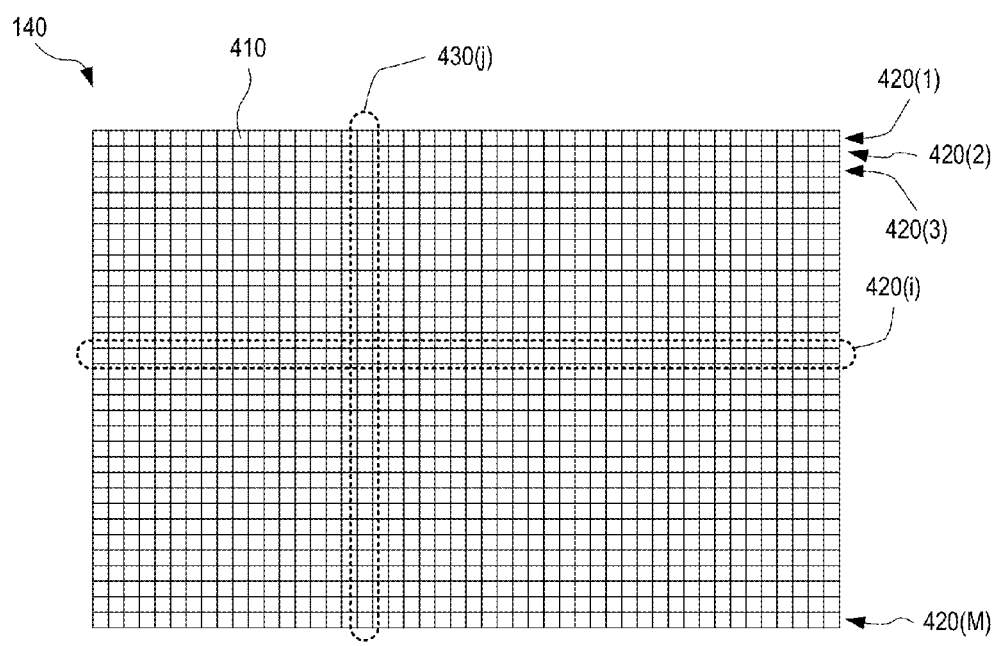
FIG. 4 illustrates the configuration of an image captured by the imaging system of FIG. 1, according to an embodiment.

FIG. 4 illustrates the configuration of image 140. Image 140 includes a plurality of pixels 410 arranged in an array with rows 420 and columns 430. For clarity of illustration, not all pixels 410, rows 420, and columns 430 are labeled in FIG. 4. Also for clarity of illustration, FIG. 4 does not display an image of scene 190. Without departing from the scope hereof, image 140 may include a different number of pixels 410, rows 420, and columns 430 than shown in FIG.

4. For example, image 140 may include hundreds or thousands of rows 420 and hundreds or thousands of columns 430.

When image 140 is a color image, pixel 410 may represent a single color pixel indicating the intensity of a single color such as one of red, green, and blue. Alternatively, pixel 410 may represent a color pixel group indicating the intensity and color as cooperatively provided by a plurality of individual color pixels.

Figure 5:
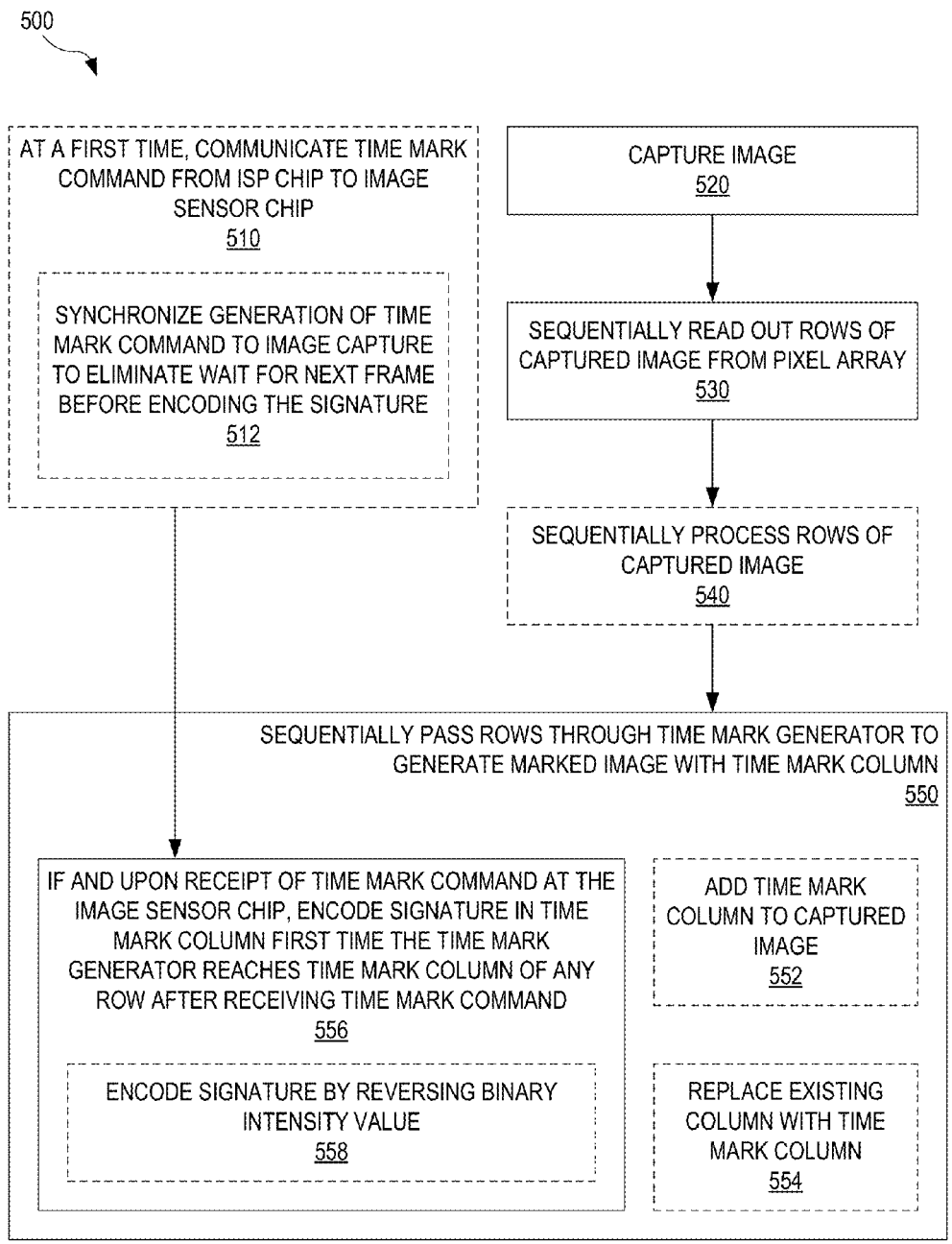
FIG. 5 illustrates a method for capturing an image using a pixel array of an image sensor chip and encoding, onboard the image sensor chip, a signature in the captured image captured for the purpose of estimating an image data path delay from the image sensor chip to an ISP chip communicatively coupled with the image sensor chip, according to an embodiment.

FIG. 5 illustrates one exemplary method 500 for capturing an image using a pixel array of an image sensor chip and encoding, onboard the image sensor chip, a signature in the captured image captured for the purpose of estimating an image data path delay from the image sensor chip to an ISP chip communicatively coupled with the image sensor chip. Method 500 is based upon sequential processing of rows of the image and encodes the signature in a dedicated column of the image. Method 500 is an embodiment of a portion of method 300. At least a portion of method 500 may be performed by image sensor chip 110. In an embodiment, method 500 includes an embodiment of step 310, in which case method 500 may be performed by imaging system 100.

In a step 520, the pixel array of the image sensor chip captures an image. In one example of step 520, pixel array 112 captures image 140. Step 520 is an embodiment of step 302.

In a step 530, the image sensor chip sequentially reads out rows of the captured image from the pixel array. In one example of step 530, image sensor chip 110 sequentially reads out rows of image 140 from pixel array 112.

In an optional step 540, the image sensor chip sequentially processes rows of image 140. Step 540 is performed by first processing circuitry 216, for example. Step 540 is an embodiment of step 304 and may include types of processing similar to that discussed above for step 304 in reference to FIG. 3, albeit limited to sequential processing of rows.

In a step 550, the image sensor chip sequentially passes rows of the image through a time mark generator, onboard the image sensor chip, to generate a marked image with a time mark column. The time mark column is one column of the marked image dedicated to encoding of a signature used to estimate an image data path delay from the image sensor chip to an ISP chip communicatively coupled with the image sensor chip. In one example of step 550, image sensor chip 110 sequentially passes rows 420 of image 140 through time mark generator 114 to generate marked image 140 with a time mark column. The time mark column may be one of columns 430 of image 140 or be a column added to image 140. Time mark generator 114 processes rows 420 of image 140 in order, starting at the top with row 420(1) or starting at the bottom with row 420(M).

Step 550 implements either a step 552 or a step 554. Step 552 adds the time mark column to the captured image. In one example of step 552, time mark generator 114 adds one pixel to each row 420 of image 140, such that marked image 142 includes an extra column 430 that forms the time mark column. Step 554 replaces an existing column of the captured image with the time mark column. In one example of step 554, time mark generator 114 replaces one pixel of each row 420 of image 140, such that marked image 142 replaces one column of image 140 with the time mark column.

Step 550 includes a step 556 of, upon receipt of a time mark command, encoding a signature in the time mark column the first time the time mark generator reaches the time mark column of any row of the captured image after receiving the time mark command. Step 550 only performs step 556 if a time mark command is received before the captured image has processed all rows of the captured image. Step 550 is an embodiment of step 320. In one example of step 556, time mark generator 114 receives a time mark command 130. The first time, during sequential processing by time mark generator 114 of rows 420, time mark generator 114 reaches the time mark column of marked image 142, time mark generator encodes signature 144 in this row. Without departing from the scope hereof, the signature encoded in step 556 may span over several rows. Furthermore, encoding of the signature may be delayed by a known number of rows, without departing from the scope hereof. For example, the time mark generator may be configured to encode the signature in, or starting at, the n'th row processed by the time mark generator after receiving the time mark command.

In an embodiment, step 556 implements a step 558 of encoding the signature by reversing a binary intensity value. In this embodiment, pixels in the time mark column may take on only two intensity values, for example maximum and minimum intensity, or black and white. Step 558 may encode the signature by setting the pixel value, of the row selected for encoding of the signature, to a different one of the two possible intensity values than that of the preceding row(s). Alternatively, step 558 may encode the signature by setting the pixel value, of the row selected for encoding of the signature, to a different one of the two possible intensity values than the otherwise expected intensity value for the selected row.

In an alternate embodiment, the time mark column includes at least some image data from image 140. Signature 144 may be overlaid on existing image data, for example in a manner similar to a watermark. In one such example, signature 144 is encoded into one bit plane of the image data of the time mark column.

The execution of steps 520, 530, 540 (if included), and 550 may be staggered such that at least some rows of the captured image reaches one of steps 530, 540 (if included), and 550 before all rows of the captured image have been processed by the preceding one of steps 520, 530, and 540 (if included).

Optionally, method 500 further includes a step 510 of generating the time mark command onboard an ISP chip and communicating the time mark command to the image sensor chip. Step 510 is an embodiment of step 310 and may be performed by data path delay measurement module 122. Step 510 may include a step 512 of synchronizing generation of the time mark command to image capture by the image sensor chip to ensure eliminate, in step 550, a wait time for the next image 140. Such a wait time may otherwise lead to an erroneously large estimate of the image data path delay. In one example of step 512, imaging system 100 utilizes connection 275 to synchronize generation of time mark command 130 by data path delay generation module 122 with capture of image 140 by pixel array 112, as discussed above in reference to FIG. 2.

Without departing from the scope hereof, the time mark column may include several adjacent columns of the marked image.

Figure 6:
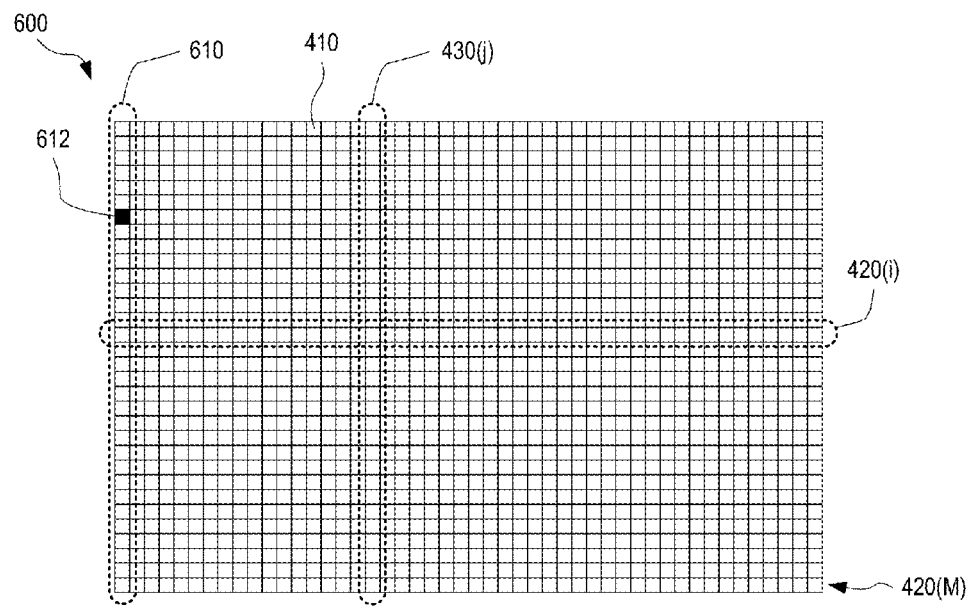
FIG. 6 illustrates a marked image that includes a binary time mark column for encoding a signature as a different intensity value than the default intensity value of time mark column, according to an embodiment.

FIG. 6 illustrates one exemplary marked image 600 that includes a binary time mark column 610 for encoding a signature 612 as a different intensity value than the default intensity value of time mark column 610. Marked image 600 is an embodiment of marked image 142. Signature 612 is an embodiment of signature 144. Marked image 600 may be generated by method 500, for example using time mark generator 114. Marked image 600 is similar to image 140, except for including time mark column 610. Time mark column 610 may replace a column in image 140, or be a column added to image 140. In an embodiment, time mark column 610 is either at the left extreme of marked image 600 (as shown in FIG. 6) or at the right extreme of marked image 600. However, time mark column 610 may also be away from the left and right extremes of marked image 600, without departing from the scope hereof.

In marked image 600, the intensity value of pixels 410 in time mark column 610 is per default a first one of the two possible intensity values, and signature 612 appears as a pixel 410 with the other one of the two possible intensity values.

Without departing from the scope hereof, time mark column 610 may include several adjacent columns 430 of marked image 600.

Figure 7:
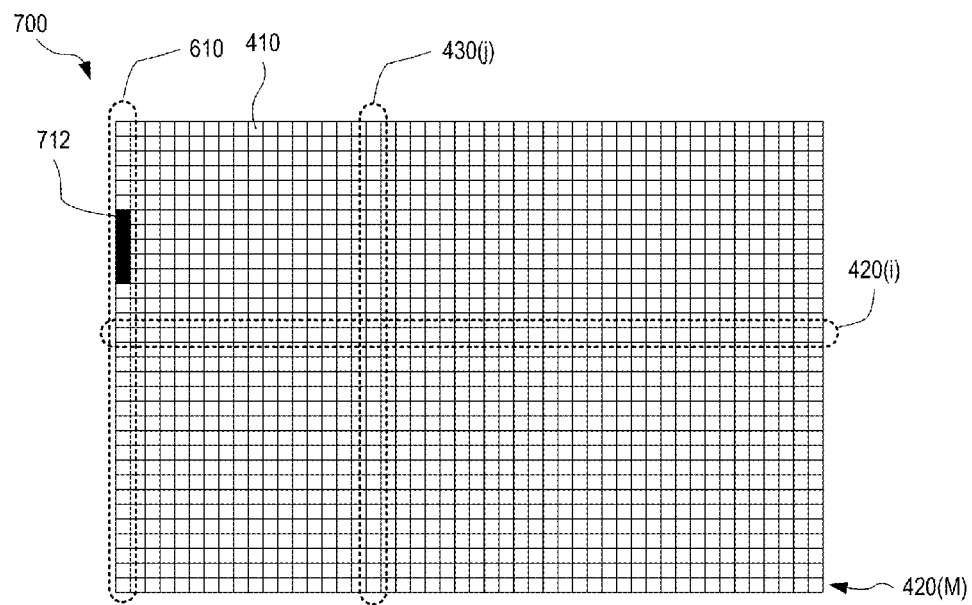
FIG. 7 illustrates another marked image that encodes a signature in the time mark column as a series of pixels with a different intensity value than the default intensity value of time mark column, according to an embodiment.

FIG. 7 illustrates another exemplary marked image 700 that encodes a signature 712 in time mark column 610 as a series of pixels with a different intensity value than the default intensity value of time mark column 610. Marked image 700 is an embodiment of marked image 142. Signature 712 is an embodiment of signature 144. Marked image 700 may be generated by method 500, for example using time mark generator 114. Marked image 700 is similar to marked image 600, except for signature 712 extending across several rows 420 of time mark column 610. The first row having the lower intensity value may be used for subsequent estimation of the image data path delay.

Figure 8A:
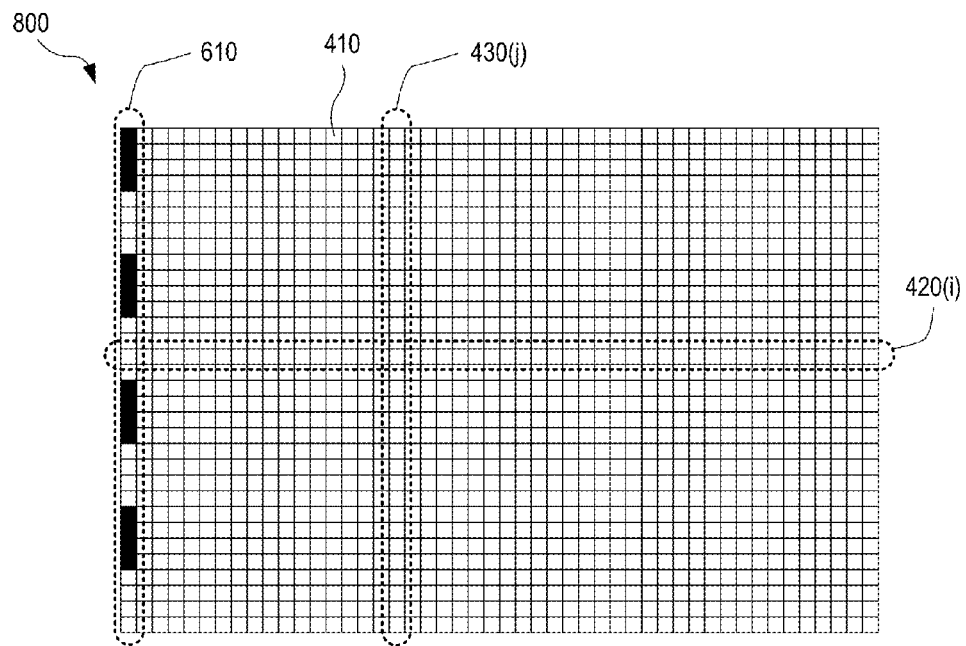
FIGS. 8A and 8B illustrate encoding of a signature as a deviation from a predefined binary pattern, according to an embodiment.
Figure 8B:
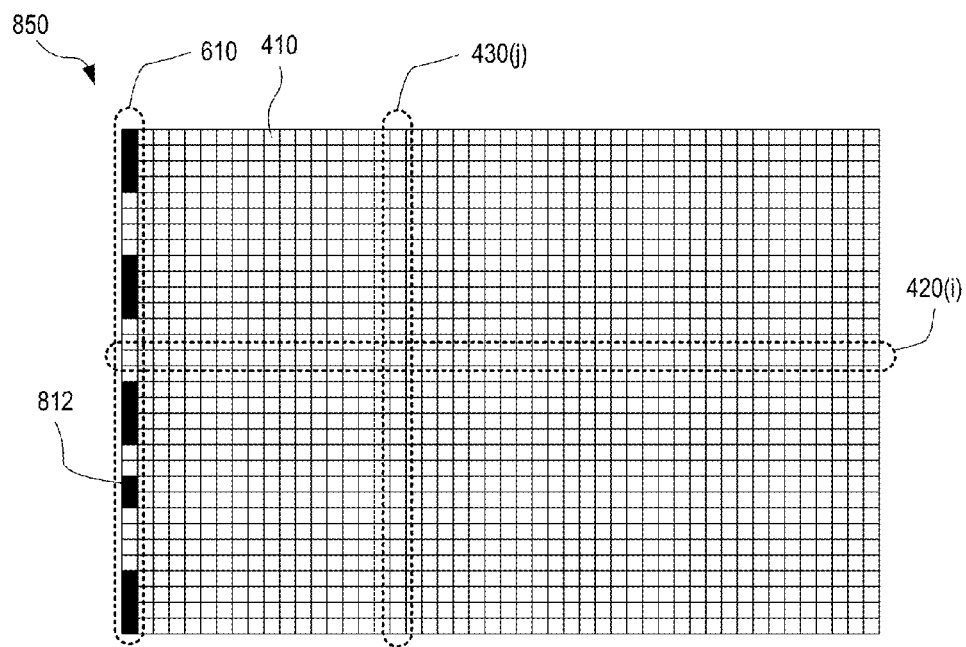

FIGS. 8A and 8B illustrate encoding of a signature as a deviation from a predefined binary pattern. FIG. 8A shows a marked image 800 that has not been encoded with a signature. FIG. 8B shows a corresponding marked image 850 that has been encoded with a signature 812. Each of marked images 800 and 850 is an embodiment of marked image 142. Signature 812 is an embodiment of signature 144. Marked images 800 and 850 may be generated by method 500, for example using time mark generator 114. FIGS. 8A and 8B are best viewed together.

Marked images 800 and 850 are similar to marked image 600, except that the default constant intensity value of time mark column 610 in marked image 600 is replaced by a default binary pattern. Unless signature 812 is encoded in marked image 800, the intensity value of pixels 410 in time mark column 610 of marked image 800 is reversed every m'th row. FIG. 8A shows a binary pattern that reverses the intensity value every 4th row 420, that is, m equals 4. However, without departing from the scope hereof, the binary pattern may reverse the intensity value at a different regular interval, and m may be any integer. For example, the binary pattern may reverse the intensity value at every 8th row 420.

Signature 812 in marked image 850 appears as a reversal of the intensity value at an unexpected row 420. Although not illustrated in FIGS. 8A and 8B, signature 812 may be encoded in a row 420 associated with a reversal of the intensity value. In this case, signature 812 appears in marked image 850 as a missing reversal of the intensity value, as compared to the default binary pattern.

The binary pattern of marked images 800 and 850 is easily distinguished from the remainder of marked images 800 and 850, respectively, such that time mark column 610 is easily recognized as not containing image data pertaining to scene 190.

Figure 9:
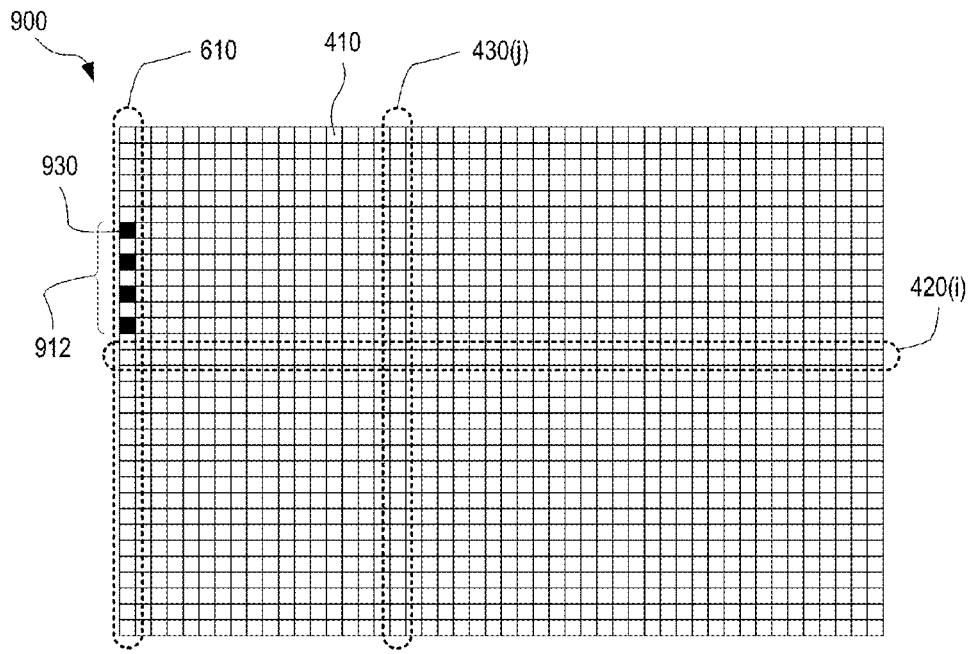
FIG. 9 illustrates a marked image with a signature that spans across several rows, according to an embodiment.

FIG. 9 illustrates one exemplary marked image 900 with a signature 912 that spans across several rows 420. Signature 912 is a binary pattern that alternates between two intensities. The intensity may alternate every row 420 or every n'th row 420. Data path delay measurement module 122 may identify signature 912 and define $T_2$ as the time of receiving the first row (labeled 930 in FIG. 9) of signature 912. Marked image 900 is an embodiment of marked image 142. Signature 912 is an embodiment of signature 144. Marked image 900 may be generated by method 500, for example using time mark generator 114.

Figure 10:
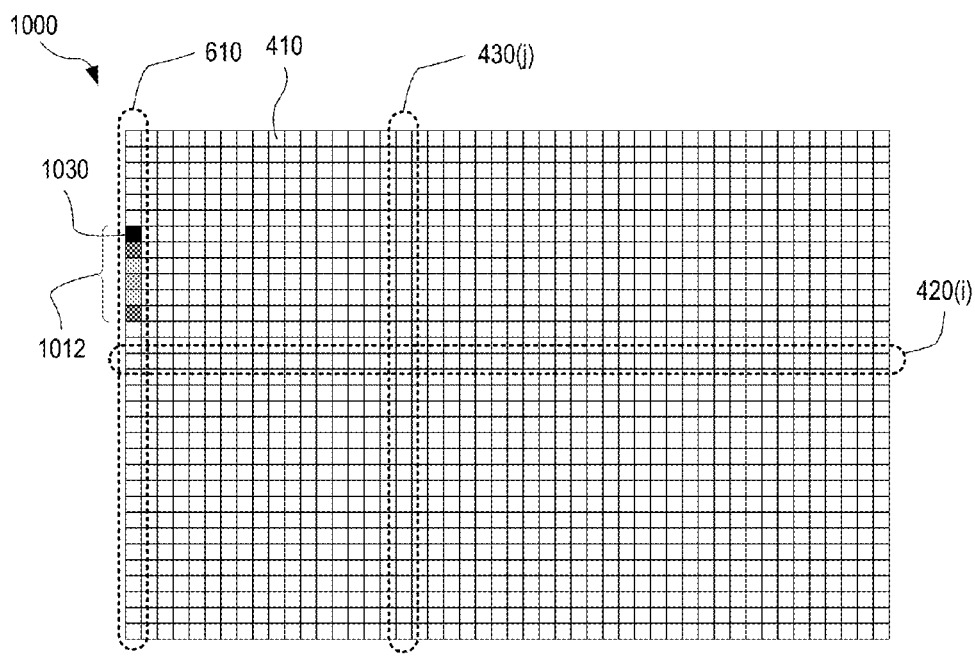
FIG. 10 illustrates another marked image with a signature that spans across several rows, according to an embodiment.

FIG. 10 illustrates another exemplary marked image 1000 with a signature 1012 that spans across several rows 420. Signature 1012 is a predefined intensity variation pattern which is not necessarily limited to two intensities. Data path delay measurement module 122 may search marked image 1000 for signature 1012, identify signature 1012 in a marked image 1012, and define $T_2$ as the time of receiving the first row (labeled 1030 in FIG. 10) of signature 1012. Marked image 1000 is an embodiment of marked image 142. Signature 1012 is an embodiment of signature 144. Marked image 1000 may be generated by method 500, for example using time mark generator 114.

Figure 11:
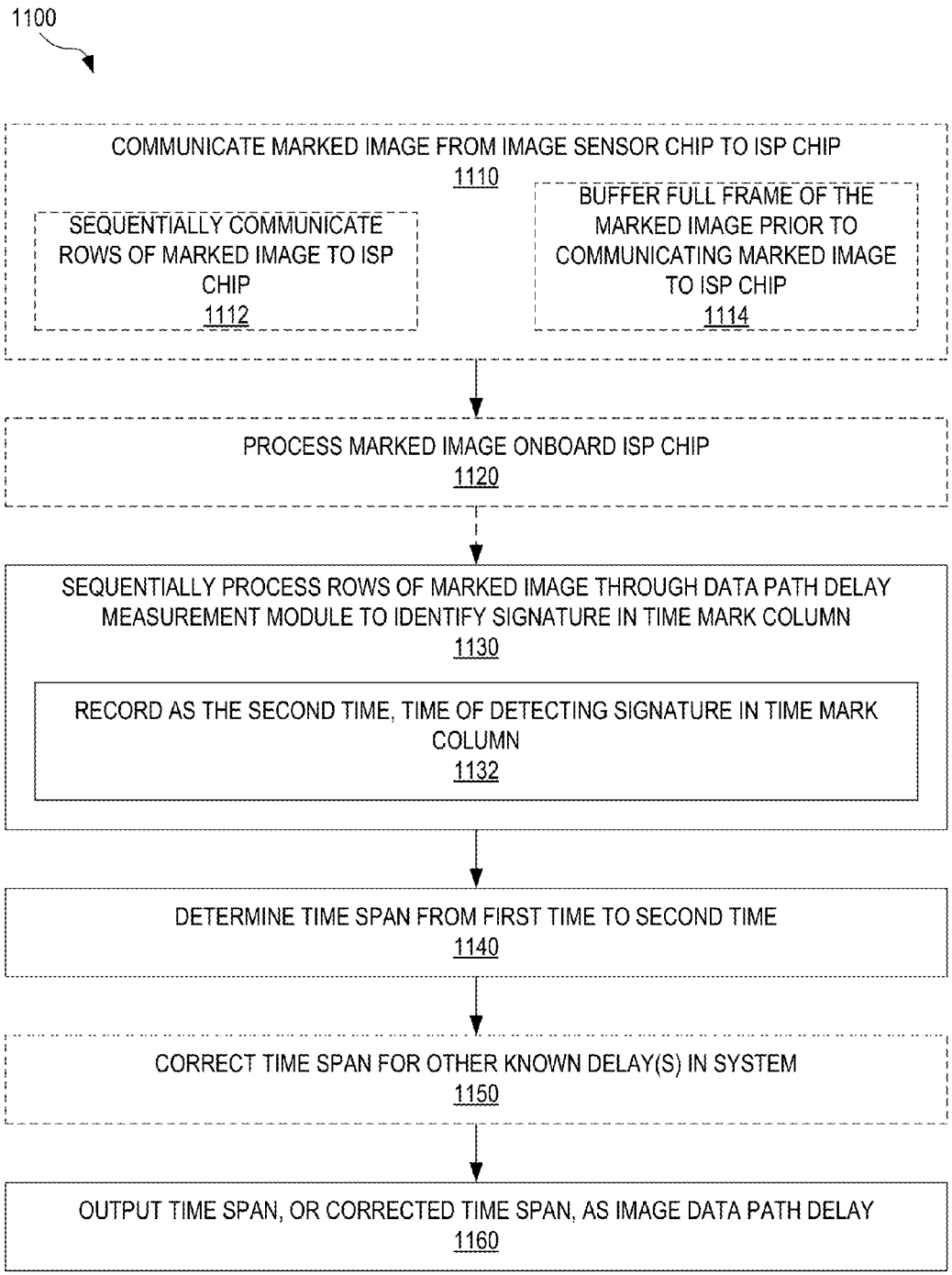
FIG. 11 illustrates a method for processing a marked image to determine an image data path delay from an image sensor chip, used to generate the marked image, to an ISP chip communicatively coupled with the image sensor chip, according to an embodiment.

FIG. 11 illustrates one exemplary method 1100 for processing a marked image, such as marked image 140, to determine an image data path delay from an image sensor chip, used to generate the marked image, to an ISP chip communicatively coupled with the image sensor chip. Method 1100 is based upon sequential processing of rows of the marked image to identify a signature in the marked image. Method 500 is an embodiment of a portion of method 300. At least a portion of method 1100 may be performed by ISP chip 120. In an embodiment, method 1100 includes an embodiment of step 340, in which case method 500 may be performed by imaging system 100.

Method 1100 may be combined with method 500, such that method 1100 is performed after step 550 of method 500. Without departing from the scope hereof, method 1100 may commence for some rows of the marked image before method 500 is complete for all rows of the marked image.

In a step 1130, an ISP chip communicatively coupled with an image sensor chip used to generate a marked image, such as marked image 142, sequentially processes rows of the marked image through a data path delay measurement module, onboard the ISP chip, to identify a signature in a time mark column of the marked image. Step 1130 is an embodiment of step 360. In one example of step 1130, data path delay measurement module 122 sequentially processes rows 420 of marked image 142 to identify signature 144 in a time mark column of marked image 142. The time mark column is, for example, time mark column 610.

Step 1130 includes a step 1132 of recording, as $T_2$, the time of detecting the signature in the marked image. In one example of step 1132, data path delay measurement module 122 detects signature 144 in marked image 142 and records as $T_2$ the time of detecting signature 144, wherein this time is provided by clock 228.

In a step 1140, the data path delay measurement module determines the time span from $T_1$ to $T_2$, that is, calculates $T_2-T_1$, wherein T1 is the time of generating the time mark command used to trigger encoding of the signature in the marked image. T1 is determined in step 310 of method 300 or in step 510 of method 500. In one example of step 1140, data path delay measurement module 122 calculates $T_2-T_1$. Step 1140 is an embodiment of step 370.

In an optional step 1150, the time span determined in step 1140 is corrected for other known delays in the imaging system. Step 1150 is similar to step 372 of method 300. Step 1150 is an embodiment of step 372 and may cooperate with step 1140 to form an embodiment of step 370.

In a step 1160, method 1100 outputs as the image data path delay $T_2-T_1$ or an associated corrected value obtained in step 1150. In one example of step 1160, data path delay measurement module 122 outputs $T_2-T_1$, or an associated corrected value, as image data path delay 150.

Method 1100 may include a step 1110 of communicating the marked image from the image sensor chip to the ISP chip prior to performing step 1130, optionally through intermediate processing circuitry such as intermediate processing circuitry 270. Step 1110 is an embodiment of step 340. Step 1110 implements either a step 1112 or a step 1114. In step 1112, the image sensor chip sequentially communicates rows of the marked image to the ISP chip without buffering the full frame of the marked image. In one example of step 1112, image sensor chip 110 sequentially communicates rows of marked image 140 to ISP chip 120. In step 1114, the image sensor chip buffers the full frame of the marked image 142 prior to communicating the marked image to the ISP chip as a full frame or as a series of rows. In one example of step 1114, image sensor chip 110 buffers the full frame of marked image 142 and subsequently communicates marked image 142 to ISP chip 120 either as a full frame or as a series of rows. Without departing from the scope hereof, step 1114 may be replaced by a step of communicating the marked image from the image sensor chip to a full frame buffer, and then communicating the marked image from the full frame buffer to the ISP chip. For example, image sensor chip 110 may communicate marked image 142 to a full frame buffer within intermediate processing circuitry 270, whereafter intermediate processing circuitry 270 communicates marked image 142 from the full frame buffer to ISP chip 120.

Method 1100 may further include a step 1120 after step 1110 and before step 1130. Step 1120 processes the marked image onboard the ISP chip. Step 1120 is similar to step 350.

In embodiments of method 1100 wherein the ISP chip sequentially receives rows of the marked image, step 1130 may commence for some rows of the marked image before step 1110, and optionally step 1120, is complete for all rows of the marked image.

Figure 12:
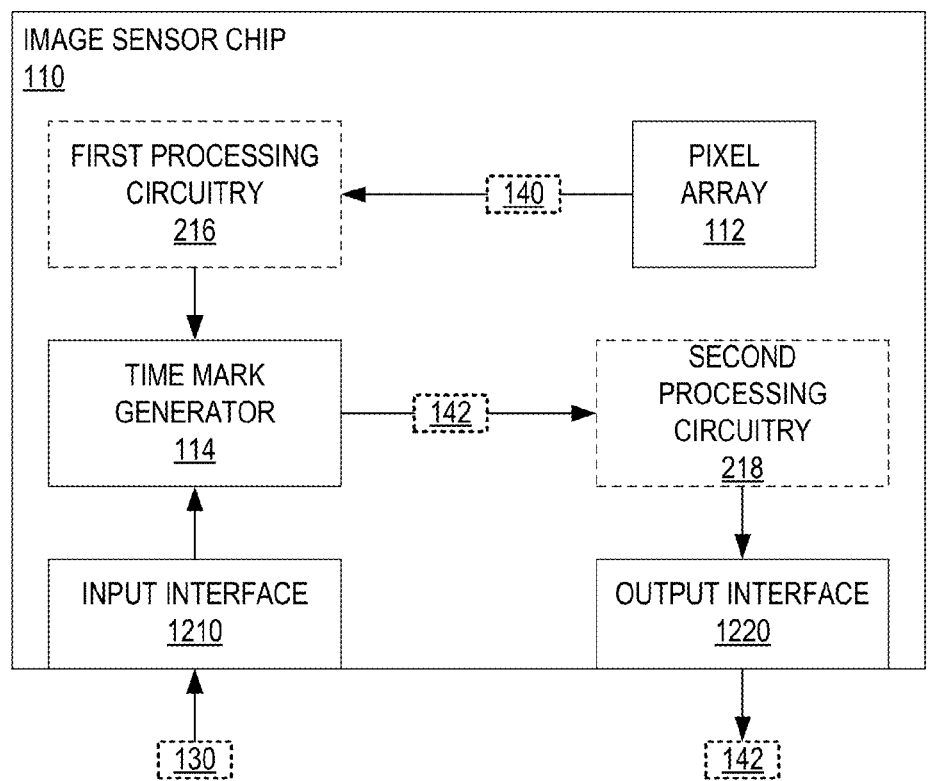
FIG. 12 shows an image sensor chip of the imaging system of FIG. 1 in further detail, according to an embodiment.

FIG. 12 shows image sensor chip 110 in further detail. In addition to the components shown in FIGS. 1 and 2, image sensor chip 110 includes an input interface 1210 and an output interface 1220. Input interface 1210 receives time mark command 130 and communicates time mark command 130 to time mark generator 114. Output interface outputs marked image 142, for example to ISP chip 120.

Figure 13:
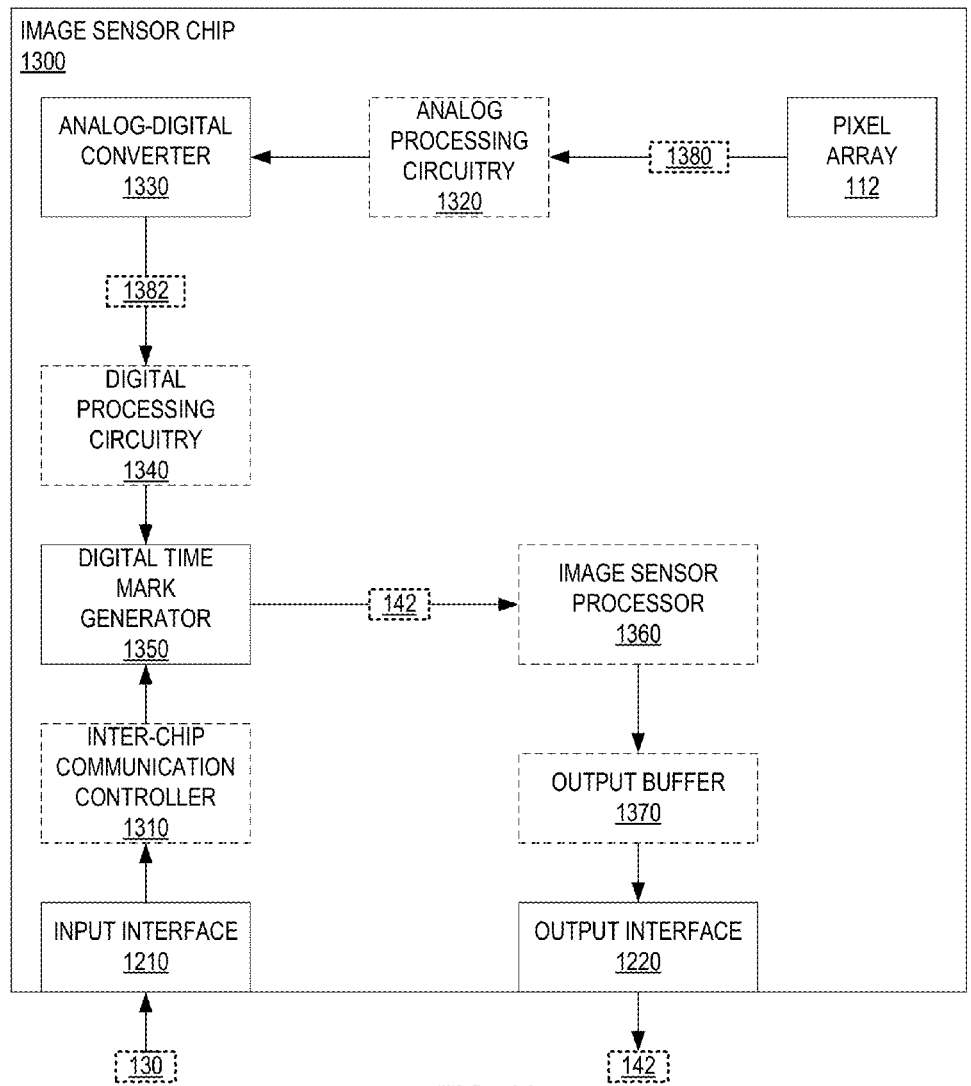
FIG. 13 illustrates an image sensor chip configured to encode a signature in a digital image, according to an embodiment.

FIG. 13 illustrates one exemplary image sensor chip 1300 configured to encode a signature in a digital image. Image sensor chip 1300 is an embodiment of image sensor chip 110. Image sensor chip 1300 may perform method 500, without step 510. Image sensor chip 1300 may further process embodiments of step 1110 of method 1100.

Image sensor chip 1300 includes pixel array 112, an analog-to-digital converter 1330, a digital time mark generator 1350, input interface 1210, and output interface 1220. Analog-to-digital converter 1330 converts an analog image 1380 captured by pixel array 112 to a digital image 1382. Upon receipt of time mark command 130 from input interface 1210, or at first opportunity after receipt of time mark command 130 from input interface 1210, digital time mark generator 1350 encodes signature 144 in digital image 1382 to produce marked image 142 in digital form. Digital time mark generator 1350 is an embodiment of time mark generator 114 configured to encode signature 144 in a digital image.

In an embodiment, image sensor chip 1300 includes analog processing circuitry 1320 that processes analog image 1380 prior to conversion of analog image 1380 to digital image 1382 by analog-to-digital converter 1330. In an embodiment, image sensor chip 1300 includes digital processing circuitry 1340 that processes digital image 1382 prior to communicating digital image 1382 to digital time mark generator 1350. Analog-to-digital converter 1330, optionally together with one or both of analog processing circuitry 1320 and digital processing circuitry 1340, form an embodiment of first processing circuitry 216.

In an embodiment, image sensor chip 1300 includes an image sensor processor 1360 that processes marked image 142 before output interface 1220 outputs marked image 142. Image sensor processor 1360 is a microprocessor, for example. Image sensor processor 1360 forms an embodiment of at least a portion of second processing circuitry 218. Optionally, image sensor chip 1300 includes an output buffer 1370 that buffers one or more rows of marked image 142 or buffers the full frame of marked image 142 before output interface 1220 outputs marked image 142. Output buffer 1370 forms an embodiment of at least a portion of second processing circuitry 218.

Image sensor chip 1300 may also include an inter-chip communication controller 1310 that controls communication with an ISP chip, such as ISP chip 120, via input interface 1210.

Figure 14:
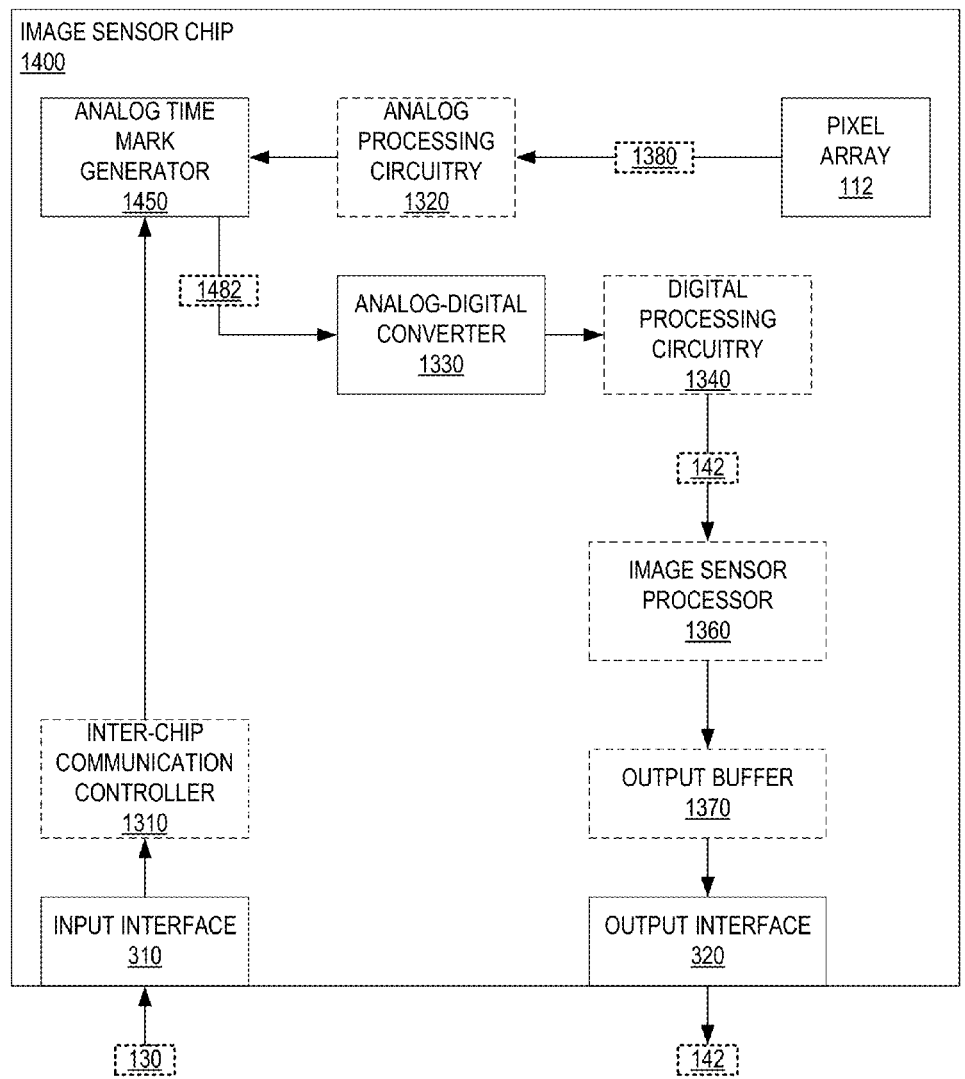
FIG. 14 illustrates an image sensor chip configured to encode a signature in an analog image, according to an embodiment.

FIG. 14 illustrates one exemplary image sensor chip 1400 configured to encode a signature in an analog image. Image sensor chip 1400 is an embodiment of image sensor chip 110. Image sensor chip 1400 may perform method 500, without step 510. Image sensor chip 1400 may further process embodiments of step 1110 of method 1100.

Image sensor chip 1400 is similar to image sensor chip 1300 except for digital time mark generator 1350 being replaced by an analog time mark generator 1450. Analog time mark generator 1450 is placed upstream of analog-to-digital converter 1330 and encodes signature 144 in analog image 1380 to produce an analog marked image 1482. Analog-to-digital converter 1330 converts analog marked image 1482 to marked image 142 in digital form.

If included, analog processing circuitry 1320 forms an embodiment of first processing circuitry 216. Analog-to-digital converter 1330, optionally in cooperation with one or more of digital processing circuitry 1340, image sensor processor 1360, and output buffer 1370, forms an embodiment of second processing circuitry 218.

Figure 15:
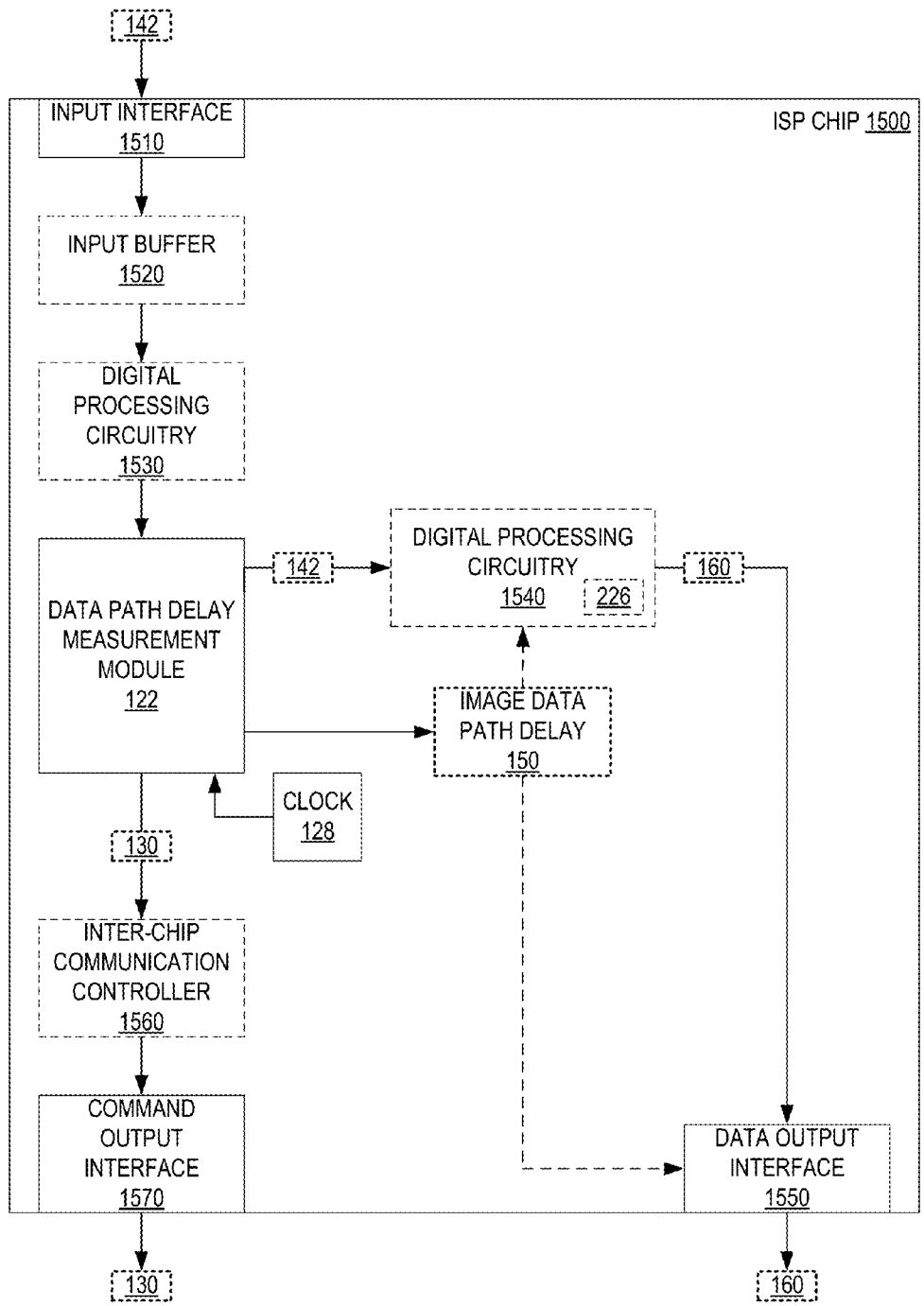
FIG. 15 illustrates an image signal processing chip configured for image data path delay measurement, according to an embodiment.

FIG. 15 illustrates one exemplary ISP chip 1500 configured for image data path delay measurement. ISP chip 1500 is an embodiment of ISP chip 120 and may perform a portion of each of methods 300 and 1100. In addition to the components shown in FIGS. 1 and 2 for ISP chip 120, ISP chip 1500 includes an input interface 1510, a command output interface 1570, and a data output interface 1550. Input interface 1510 receives marked image 142 from an image sensor chip such as image sensor chip 110. Command output interface 1570 outputs time mark command 130 to an image sensor chip such as image sensor chip 110. Data output interface 1550 outputs output data 160, and optionally image data path delay 150.

ISP chip 1500 may include an inter-chip communication controller 1560 that controls communication of time mark command 130 via command output interface 1570.

ISP chip 1500 may include an input buffer 1520 that buffers one or more rows of marked image 142, or the full frame of marked image 142, as received via input interface 1510 from an image sensor chip such as image sensor chip 110. Input buffer 1520 is an embodiment of at least a portion of processing circuitry 224.

In an embodiment, ISP chip 1500 is configured to process a digital marked image 142. In this embodiment, ISP chip 1500 may include digital processing circuitry 1530 that processes a digital marked image 142 prior to communicating the digital marked image 142 to data path delay measurement module 122. Digital processing circuitry 1530 is an embodiment of at least a portion of processing circuitry 224. Also in this embodiment, ISP chip 1500 may include digital processing circuitry 1540 that processes a digital marked image 142 received from data path delay measurement module 122. Digital processing circuitry 1540 is an embodiment of at least a portion of processing circuitry 224. Digital processing circuitry 1540 may include image cleanup module 226. Without departing from the scope hereof, ISP chip 1500 may implement image cleanup module 226 elsewhere in the image data path within ISP chip 120 and downstream from data path delay measurement module 122.

Figure 16:
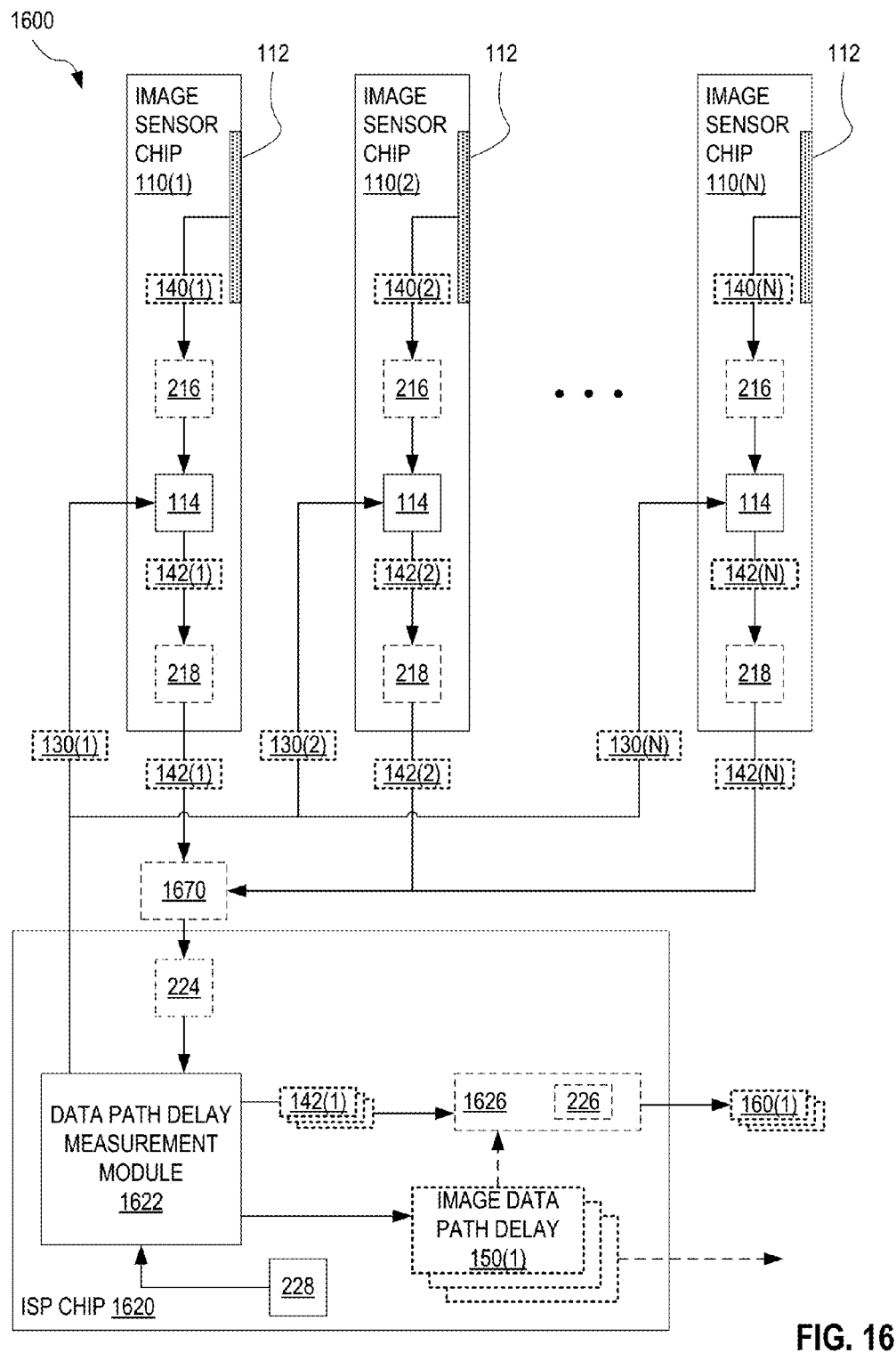
FIG. 16 illustrates a multi-sensor imaging system with a plurality of image sensor chips communicatively coupled with a single image signal processing chip, according to an embodiment.

FIG. 16 illustrates one exemplary multi-sensor imaging system 1600 with a plurality of image sensor chips 110 communicatively coupled with a single ISP chip 1620. ISP chip 1620 is an embodiment of ISP chip 120. Multi-sensor imaging system 1600 has integrated image data path delay measurement functionality and is capable of estimating the image data path delay between image capture by each of image sensor chips 110 and processing by ISP chip 1620. Multi-sensor imaging system 1600 is an embodiment of imaging system 100 that includes additional image sensor chips 110, and wherein ISP chip 1620 processes marked images 142 from each one of the plurality of image sensor chips 110.

ISP chip 1620 implements a data path delay measurement module 1622 which is an embodiment of data path delay measurement module 122. Data path delay measurement module 1622 is configured to generate one or more time mark commands 130 for each image sensor chip 110. Data path delay measurement module 1622 is also configured to identify signature 144 in one or more marked images 142 received from each image sensor chip 110 to determine image data path delay 150 associated with each image sensor chip 110.

ISP chip 1620 may be implemented in a manner similar to that of ISP chip 1500, for example to process marked images 142 in digital form.

Optionally, multi-sensor imaging system 1600 includes intermediate processing circuitry 1670. Intermediate processing circuitry 1670 is an embodiment of intermediate processing circuitry 270, which is configured to receive marked images 142 from each of image sensor chips 110. In one example, intermediate processing circuitry 1670 includes one or more buffers for buffering of marked images 142.

In certain embodiments, ISP chip 1620 includes processing circuitry 1626. Processing circuitry 1626 is an embodiment of processing circuitry 126, which is configured to process marked images 142 generated by the plurality of image sensor chips 110. In one such embodiment, processing circuitry 1626 is capable of stitching together image data from marked image 142 received from different image sensor chips 110 to produce composite image data, for example representing a larger field of view than what may be achieved using a single image sensor chip 110. Processing circuitry 1626 may include image cleanup module 226. Without departing from the scope hereof, ISP chip 1620 may implement image cleanup module 226 elsewhere in the image data path within ISP chip 1620 and downstream from data path delay measurement module 1622.

In multi-sensor imaging system 1600, each of one or more of image sensor chips 110 may be implemented as image sensor chip 1300 or as image sensor chip 1400. Not all image sensor chips 110 need to be identical.

Figure 17:
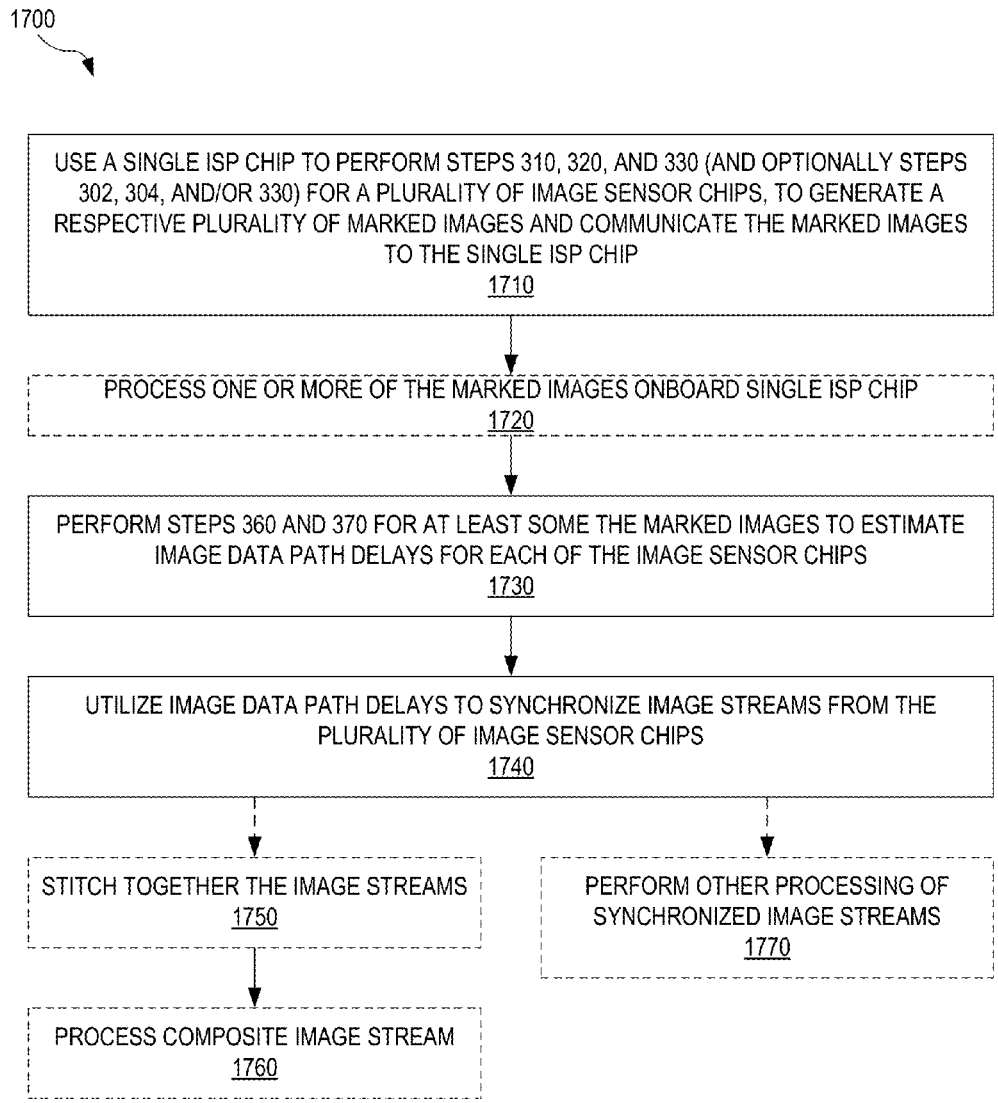
FIG. 17 illustrates a method for synchronizing image streams generated by a plurality of image sensor chips implemented in a multi-sensor imaging system including a single image signal processing chip communicatively coupled with the plurality of image sensor chips, according to an embodiment.

FIG. 17 illustrates one exemplary method 1700 for synchronizing image streams generated by a plurality of image sensor chips implemented in a multi-sensor imaging system including a single ISP chip communicatively coupled with the plurality of image sensor chips. Method 1700 is an embodiment of method 300 capable of determining the image data path delay for the plurality of image sensor chips to synchronize image streams respectively generated by the plurality of image sensor chips. Method 1700 may be performed by multi-sensor imaging system 1600.

In a step 1710, method 1700 performs steps 310, 320, and 330, and optionally steps 302, 304, and/or 330, of method 300 for each of a plurality of image sensor chips to generate a plurality of marked images and communicate the marked images to the single ISP chip. In one example of step 1710, multi-sensor imaging system 1600 performs steps 310, 320, and 330, and optionally steps 302, 304, and/or 330, of method 300 for each of the plurality of image sensor chips 110 to generate a plurality of marked images 142 and communicate the plurality of marked images 142 to ISP chip 120.

An optional step 1720 processes one or more of the marked images onboard the ISP chip. In one example of step 1720, processing circuitry 224 processes one or more marked images 142 received from at least a subset of the plurality of image sensor chips 110.

In a step 1730, the ISP chip performs steps 360 and 370 of method 300 for at least some of the marked images, generated in step 1710, to estimate image data path delays for each of the plurality of image sensor chips. In one example of step 1730, data path delay measurement module 1622 performs steps 360 and 370 to estimate image data path delay 150 for each image sensor chip 110.

In a step 1740, the ISP chip utilizes the image data path delays estimated in step 1730 to synchronize a plurality of streams of marked images generated by the plurality of image sensor chips, respectively. Step 1740 synchronizes the streams of marked images according to the estimated image data path delays to at least partly correct artifacts caused by differences in image data path delays between different image sensor chips. In one example of step 1740, processing circuitry 1626 utilizes the image data path delay 150, estimated for each image sensor chip 110, to synchronize a plurality of streams of marked images 142 respectively generated by the plurality of image sensor chips 110.

In an optional step 1750, the ISP chip stitches together the synchronized image streams to form a single composite image stream with image data generated by each of the plurality of image sensor chips. In one implementation, the single image composite stream represents the combination of all fields of view of the plurality of image sensor chips. Step 1750 may be performed by processing circuitry 1626. Without departing from the scope hereof, step 1750 may include removing some spatial portions of at least one of the image streams. For example, step 1750 may remove a time mark column from each marked image used to generate the single composite image stream. Step 1750 may also, for one or more of the marked images, utilize only a spatial subset of the marked images. In one example of step 1750, processing circuitry 1626 stitches together a plurality of synchronized streams of marked images 142 respectively generated by the plurality of image sensor chips 110. Image cleanup module 226 may remove time mark columns from the synchronized streams of marked images 142 prior to stitching.

In an optional step 1760, the ISP chip performs other processing of the single composite image stream, such as object recognition. Step 1760 may be performed by processing circuitry 1626.

In an optional step 1770, the ISP chip performs other processing of the synchronized image streams, such as object recognition. Step 1770 may be performed by processing circuitry 1626.

Figure 18:
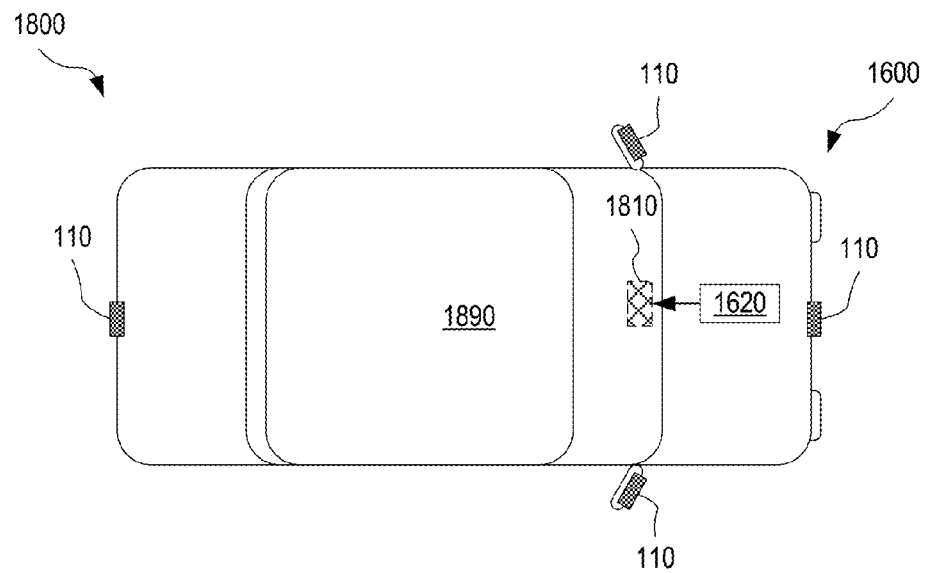
FIG. 18 illustrates an automotive multi-sensor imaging system used to generate imagery of the surroundings of a vehicle, according to an embodiment.

FIG. 18 illustrates one exemplary automotive multi-sensor imaging system 1800 used to generate imagery of the surroundings of a vehicle 1890. Imaging system 1800 implements multi-sensor imaging system 1600 with a plurality of image sensor chips mounted to different positions on vehicle 110 to image different respective fields of view. For clarity of illustration, connections between image sensor chips 110 and ISP chip 1620 are not shown in FIG. 18. In an embodiment, imaging system 1800 includes a display 1810 that displays images captured by one or more of image sensor chips 110.

Imaging system 1800 may perform method 1700 to generate (a) two or more synchronized image streams with imagery from two or more image sensor chips 110, respectively, (b) a single composite image stream that includes imagery from two or more image sensor chips 110. Imaging system 1800 may display the synchronized image streams or the single composite image stream on display 1810. Alternatively, or in combination therewith, imaging system 1800 may perform step 1760 and/or step 1770 of method 1700, for example to recognize objects in the images captured by image sensor chips 110, such as nearby obstacles, pedestrians, or other vehicles.

Imaging system 1800 is readily adapted to other applications requiring imaging of several different fields of view. For example, imaging system 1800 may be implemented as a surveillance imaging system.

Combinations of Features

Features described above as well as those claimed below may be combined in various ways without departing from the scope hereof. For example, it will be appreciated that aspects of one imaging system or method with data path delay measurement, described herein, may incorporate or swap features of another imaging system or method with data path delay measurement described herein. The following examples illustrate some possible, non-limiting combinations of embodiments described above. It should be clear that many other changes and modifications may be made to the systems and methods herein without departing from the spirit and scope of this invention:

(A1) An imaging system with image data path delay measurement may include (a) a first image sensor chip that includes (i) a pixel array for generating a first image in response to light incident upon the pixel array, and (ii) a time mark generator for, upon receiving a time mark command, encoding a signature in the first image to generate a first marked image with the signature and image data from the first image, and (b) an image signal processing chip for processing the first marked image, wherein the image signal processing chip includes a data path delay measurement module for generating the time mark command and estimating image data path delay from the pixel array to the data path delay measurement module based upon time delay between (a) said generating the time mark command and (b) receipt of the signature as part of the first marked image.

(A2) In the imaging system denoted as (A1), the image signal processing chip may further include image processing circuitry for processing the marked image prior to communicating the marked image to the data path delay measurement module.

(A3) Either or both of the imaging systems denoted as (A1) and (A2) may further include a second image sensor chip including (a) a second pixel array for generating a second image in response to light incident upon the second pixel array, and (b) a second time mark generator for, upon receiving a second time mark command, encoding a second signature in the second image to generate a second marked image with the second signature and image data from the second image, wherein the data path delay measurement module further is configured to generate the second time mark command and estimate a second image data path delay from the second pixel array to the data path delay measurement module based upon time delay between (i) generating the second time mark command and (ii) receipt of the second signature as part of the second marked image.

(A4) In the imaging system denoted as (A3), the image signal processing chip may further include a synchronization module for synchronizing a stream of first marked images received from the first image sensor chip with a stream of second marked images received from the second image sensor chip, based upon (a) at least one measurement by the data path delay measurement module of the first image data path delay for at least one of the first marked images, and (b) at least one measurement by the data path delay measurement module of the second image data path delay for at least one of the second marked images.

(A5) In any of the imaging systems denoted as (A1) through (A4), the first time mark generator may be configured to sequentially process rows of the first image, and to encode the signature in a time mark column of the first marked image first time the time mark generator reaches the time mark column of any of the rows after receiving the time mark command.

(A6) In any of the imaging systems denoted as (A1) through (A5), the first image sensor chip and the image signal processing chip may be configured to sequentially communicate rows of the first marked image from the first image sensor chip to the image signal processing chip.

(A7) In any of the imaging systems denoted as (A1) through (A6), the first time mark generator may be configured to (a) generate a binary pattern in the time mark column, wherein the binary pattern is a regular pattern switching between two intensity values every N rows unless the time mark generator encodes the signature, and wherein N is a positive integer, and (b) encode the signature as a switch from a present one of the two intensity values of the regular pattern to another one of the two intensity values of the regular pattern.

(A8) In the imaging system denoted as (A7), the data path delay measurement module may be configured to identify the signature in the time mark column as a deviation from the regular pattern.

(A9) In either or both of the imaging systems denoted as (A7) and (A8), the image signal processing chip may further include an image cleanup module for removing the time mark column from the first marked image.

(B1) A method for measuring image data path delay of an imaging system may include (a) at a first time, communicating a first time mark command from an image signal processing chip to a first image sensor chip, (b) upon receipt of the first time mark command at the first image sensor chip, encoding a first signature in a first image captured by a first pixel array on the first image sensor chip, to generate a first marked image with the first signature and image data from the first image, (c) communicating the first marked image from the image sensor chip to the image signal processing chip, (d) identifying the first signature in the first marked image, using a data path delay measurement module onboard the image signal processing chip, and (e) estimating a first image data path delay from capture of the first image by the first pixel array to the data path delay measurement module based upon time span from the first time to the time of identifying the first signature in the first marked image.

(B2) The method denoted as (B1) may further include, after the step of communicating the first marked image and prior to the step of identifying the first signature, processing the first marked image onboard the image signal processing chip.

(B3) In either or both of the methods denoted as (B1) and (B2), the step of encoding may include sequentially processing rows of the first image using a time mark generator, and encoding the first signature in a time mark column of the first marked image first time the time mark generator reaches the time mark column of any of the rows after receiving the first time mark command.

(B4) In the method denoted as (B3), the steps of sequentially processing and encoding the first signature in a time mark column may include (a) generating a binary pattern in the time mark column, wherein the binary pattern is a regular pattern switching between two intensity values every N rows unless the time mark generator encodes the first signature, wherein N is a positive integer, and (b) encoding the first signature as a switch from a present one of the two intensity values of the regular pattern to another one of the two intensity values of the regular pattern.

(B5) In the method denoted as (B4), the step of identifying may include identifying the signature in the time mark column as a deviation from the regular pattern.

(B6) In either or both of the methods denoted as (B4) and (B5), in the step of encoding, the two intensity values may be black and white.

(B7) In any of the methods denoted as (B3) through (B6), the steps of sequentially processing and encoding the first signature in a time mark column may include adding the time mark column to the first image adjacent existing columns of the first image.

(B8) In any of the methods denoted as (B3) through (B6), the steps of sequentially processing and encoding the first signature in a time mark column may include replacing an existing column of the first image with the time mark column.

(B9) Any of the methods denoted as (B1) through (B8) may further include (a) at a third time, communicating a second time mark command from the image signal processing chip to a second image sensor chip, (b) upon receipt of the second time mark command at the second image sensor chip, encoding a second signature in a second image captured by a second pixel array on the second image sensor chip, to generate a second marked image with the second signature and image data from the second image, (c) communicating the second marked image to the image signal processing chip, (d) at a fourth time and onboard the image signal processing chip, identifying the second signature in the second marked image, using the data path delay measurement module, and (e) estimating a second image data path delay from the second pixel array to the data path delay measurement module based upon time span from the third time to the fourth time.

(B10) The method denoted as (B9) may further include synchronizing a stream of first marked images received from the first image sensor chip with a stream of second marked images received from the second image sensor chip, based upon (a) at least one first image data path delay for at least one of the first marked images as determined in the step of estimating a first image data path delay, and (b) at least one second image data path delay for at least one of the second marked images as determined in the step of estimating a second image data path delay.

(C1) An image sensor chip configured for image data path delay measurement may include (a) a pixel array for generating a first image in response to light incident upon the pixel array, (b) an input interface for receiving a time mark command from circuitry external to the image sensor chip, (c) a time mark generator for, upon receiving the time mark command, encoding a signature in the first image to generate a marked image with the signature and image data from the first image, and (d) an output interface for outputting the marked image to an image processing system external to the image sensor chip.

(C2) In the image sensor chip denoted as (C1), the time mark generator may be configured to sequentially process rows of the first image and to encode the signature in a time mark column of the marked image first time the time mark generator reaches the time mark column of any of the rows after receiving the time mark command.

(C3) In either or both of the image sensor chips denoted as (C1) and (C2), the time mark generator may be configured to (a) generate a binary pattern in the time mark column, wherein the binary pattern is a regular pattern switching between two intensity values every N rows unless the time mark generator encodes the signature, wherein N is a positive integer, and (b) encode the signature as a switch from a present one of the two intensity values of the regular pattern to another one of the two intensity values of the regular pattern such that the signature appears in the time mark column as a deviation from the regular pattern.

(C4) In the image sensor chip denoted as (C3), the two intensity values may be black and white.

(C5) Any of the image sensor chips denoted as (C1) through (C4) may further include readout circuitry for reading out the first image from the pixel array as an analog image.

(C6) The image sensor chip denoted as (C5) may further include an analog-to-digital converter for converting the first image from the analog image to a digital image before communicating the first image, in the form of the digital image, to the time mark generator.

(C7) In the image sensor chip denoted as (C5), the time mark generator may be configured to receive the first image in analog form and generate the marked image in analog form.

(C8) In the image sensor chip denoted as (C7) may further include an analog-to-digital converter for converting the marked image from analog form to a digital form before communicating the marked image in digital form to the output interface.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:
1. An imaging system with image data path delay measurement, comprising:

a first image sensor chip including:
  a pixel array for generating a first image in response to light incident upon the pixel array, and
  a time mark generator for, upon receiving a time mark command, encoding a signature in the first image to generate a first marked image with the signature and image data from the first image, the time mark generator being configured to sequentially process rows of the first image, and to encode the signature in a time mark column of the first marked image a first time the time mark generator reaches the time mark column of any of the rows after receiving the time mark command, the time mark generator being configured to:
    (a) generate a binary pattern in the time mark column, the binary pattern being a regular pattern switching between two intensity values every N rows unless the time mark generator encodes the signature, N being a positive integer, and
    (b) encode the signature as a switch from a present one of the two intensity values of the regular pattern to another one of the two intensity values of the regular pattern; and
  an image signal processing chip for processing the first marked image, the image signal processing chip including:
    a data path delay measurement module for generating the time mark command and estimating image data path delay from the pixel array to the data path delay measurement module based upon time delay between (a) said generating the time mark command and (b) receipt of the signature as part of the first marked image, the data path delay measurement module being configured to identify the signature in the time mark column as a deviation from the regular pattern.

2. The imaging system of claim 1, the image signal processing chip further comprising image processing circuitry for processing the marked image prior to communicating the marked image to the data path delay measurement module.

3. The imaging system of claim 1, further comprising:
  a second image sensor chip including:
    a second pixel array for generating a second image in response to light incident upon the second pixel array, and
    a second time mark generator for, upon receiving a second time mark command, encoding a second signature in the second image to generate a second marked image with the second signature and image data from the second image;
  the data path delay measurement module further being configured to generate the second time mark command and estimate a second image data path delay from the second pixel array to the data path delay measurement module based upon time delay between (a) said generating the second time mark command and (b) receipt of the second signature as part of the second marked image.

4. The imaging system of claim 3, the image signal processing chip further comprising a synchronization module for synchronizing a stream of first marked images received from the first image sensor chip with a stream of second marked images received from the second image sensor chip, based upon (a) at least one measurement by the data path delay measurement module of the first image data path delay for at least one of the first marked images, and (b) at least one measurement by the data path delay measurement module of the second image data path delay for at least one of the second marked images.

5. The imaging system of claim 1, the first image sensor chip and the image signal processing chip being configured to sequentially communicate rows of the first marked image from the first image sensor chip to the image signal processing chip.

6. The imaging system of claim 1, the image signal processing chip further comprising an image cleanup module for removing the time mark column from the first marked image.

7. A method for measuring image data path delay of an imaging system, comprising:
  at a first time, communicating a first time mark command from an image signal processing chip to a first image sensor chip;
  upon receipt of the first time mark command at the first image sensor chip, encoding a first signature in a first image captured by a first pixel array on the first image sensor chip, to generate a first marked image with the first signature and image data from the first image, said encoding including using a time mark generator to sequentially process rows of the first image and encode the first signature in a time mark column of the first marked image a first time the time mark generator reaches the time mark column of any of the rows after receiving the first time mark command, said using a time mark generator including:
    (a) generating a binary pattern in the time mark column, the binary pattern being a regular pattern switching between two intensity values every N rows unless the time mark generator encodes the first signature, N being a positive integer, and
    (b) encoding the first signature as a switch from a present one of the two intensity values of the regular pattern to another one of the two intensity values of the regular pattern;
  communicating the first marked image from the image sensor chip to the image signal processing chip;
  identifying the first signature in the time mark column as a deviation from the regular pattern, using a data path delay measurement module onboard the image signal processing chip; and
  estimating a first image data path delay from capture of the first image by the first pixel array to the data path delay measurement module based upon time span from the first time to time of said identifying.

8. The method of claim 7, further comprising, after the step of communicating the first marked image and prior to the step of identifying the first signature, processing the first marked image onboard the image signal processing chip.

9. The method of claim 7, in the step of encoding, the two intensity values being black and white.

10. The method of claim 7, the steps of sequentially processing and encoding the first signature in a time mark column comprising adding the time mark column to the first image adjacent existing columns of the first image.

11. The method of claim 7, the steps of sequentially processing and encoding the first signature in a time mark column comprising replacing an existing column of the first image with the time mark column.

12. The method of claim 7, further comprising:
  at a third time, communicating a second time mark command from the image signal processing chip to a second image sensor chip;

upon receipt of the second time mark command at the second image sensor chip, encoding a second signature in a second image captured by a second pixel array on the second image sensor chip, to generate a second marked image with the second signature and image data from the second image;

communicating the second marked image to the image signal processing chip;

at a fourth time and onboard the image signal processing chip, identifying the second signature in the second marked image, using the data path delay measurement module; and estimating a second image data path delay from the second pixel array to the data path delay measurement module based upon time span from the third time to the fourth time.

13. The method of claim 12, further comprising synchronizing a stream of first marked images received from the first image sensor chip with a stream of second marked images received from the second image sensor chip, based upon (a) at least one first image data path delay for at least one of the first marked images as determined in the step of estimating a first image data path delay, and (b) at least one second image data path delay for at least one of the second marked images as determined in the step of estimating a second image data path delay.

14. An image sensor chip configured for image data path delay measurement, comprising:

a pixel array for generating a first image in response to light incident upon the pixel array;

an input interface for receiving a time mark command from circuitry external to the image sensor chip;

a time mark generator for, upon receiving the time mark command, encoding a signature in the first image to generate a marked image with the signature and image data from the first image, the time mark generator being configured to:

(a) sequentially process rows of the first image and to encode the signature in a time mark column of the marked image a first time the time mark generator reaches the time mark column of any of the rows after receiving the time mark command, (b) generate a binary pattern in the time mark column, the binary pattern being a regular pattern switching between two intensity values every N rows unless the time mark generator encodes the signature, N being a positive integer, and (c) encode the signature as a switch from a present one of the two intensity values of the regular pattern to another one of the two intensity values of the regular pattern such that the signature appears in the time mark column as a deviation from the regular pattern; and an output interface for outputting the marked image to an image processing system external to the image sensor chip.

15. The image sensor chip of claim 14, the two intensity values being black and white.

16. The image sensor chip of claim 14, further comprising:

readout circuitry for reading out the first image from the pixel array as an analog image; and an analog-to-digital converter for converting the first image from the analog image to a digital image before communicating the first image, in the form of the digital image, to the time mark generator.

17. The image sensor chip of claim 14, the time mark generator being configured to receive the first image in analog form and generate the marked image in analog form, the image sensor chip further comprising:

an analog-to-digital converter for converting the marked image from analog form to a digital form before communicating the marked image in digital form to the output interface.

* * * * *